US011677078B2

(12) United States Patent
Gleason et al.

(10) Patent No.: US 11,677,078 B2
(45) Date of Patent: Jun. 13, 2023

(54) ULTRATHIN CONFORMAL OCVD PEDOT COATINGS ON POROUS ELECTRODES AND APPLICATIONS THEREOF

(71) Applicant: Massachusetts Institute of Technology, Cambridge, MA (US)

(72) Inventors: Karen K. Gleason, Cambridge, MA (US); Fikile Brushett, Cambridge, MA (US); Charles Wan, Cambridge, MA (US); Antoni Forner-Cuenca, Eindhoven (NL); Meysam Heydari Gharahcheshmeh, Somerville, MA (US); Yasser Ashraf Gandomi, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 8 days.

(21) Appl. No.: 17/370,611

(22) Filed: Jul. 8, 2021

(65) Prior Publication Data
US 2022/0013787 A1  Jan. 13, 2022

Related U.S. Application Data

(60) Provisional application No. 63/050,361, filed on Jul. 10, 2020.

(51) Int. Cl.
| | |
|---|---|
| *H01M 4/62* | (2006.01) |
| *H01M 4/36* | (2006.01) |
| *H01M 4/04* | (2006.01) |
| *H01M 8/18* | (2006.01) |
| *H01M 4/66* | (2006.01) |

(52) U.S. Cl.
CPC ......... *H01M 4/624* (2013.01); *H01M 4/0404* (2013.01); *H01M 4/366* (2013.01); *H01M 4/368* (2013.01); *H01M 4/663* (2013.01); *H01M 8/188* (2013.01)

(58) Field of Classification Search
CPC .... H01M 4/624; H01M 4/0404; H01M 4/366; H01M 4/368; H01M 4/663
See application file for complete search history.

(56) References Cited

U.S. PATENT DOCUMENTS

| | | |
|---|---|---|
| 5,748,271 A | 5/1998 | Hikmet et al. |
| 2008/0081256 A1 | 4/2008 | Madou et al. |
| 2011/0315204 A1* | 12/2011 | Gleason ................ H05B 33/26 257/E31.13 |
| 2020/0020489 A1 | 1/2020 | Liu et al. |

OTHER PUBLICATIONS

International Search Report and Written Opinion for International Application No. PCT/US/21/40883 dated Oct. 18, 2021.

* cited by examiner

*Primary Examiner* — Stewart A Fraser
(74) *Attorney, Agent, or Firm* — Foley Hoag LLP; Dana M. Gordon; Alexander J. Chatterley

(57) ABSTRACT

The present disclosure relates to electrodes comprising a polymer film and a substrate, wherein the polymer film has a thickness of about 5 nm to about 600 nm. The present disclosure also relates to electrochemical cells and batteries comprising the electrodes disclosed herein. The present disclosure also relates to methods of making the electrodes disclosed herein.

20 Claims, 22 Drawing Sheets

US 11,677,078 B2

ULTRATHIN CONFORMAL OCVD PEDOT COATINGS ON POROUS ELECTRODES AND APPLICATIONS THEREOF

RELATED APPLICATIONS

This application claims the benefit of U.S. Provisional Application No. 63/050,361 filed Jul. 10, 2020; the contents of which are fully incorporated by reference herein.

GOVERNMENT SUPPORT

This invention was made with Government support under Grant No. DE-ACO2-06CH11357 awarded by the Department of Energy. The Government has certain rights in the invention.

BACKGROUND

Stationary energy storage is poised to play an instrumental role in efficiently delivering electricity, particularly from low-cost, sustainable, and variable energy sources. Redox flow batteries (RFBs) have emerged as an appealing electrochemical technology for long duration energy storage, owing to their decoupling of energy and power scaling, safety, and long operational lifetimes. However, existing RFBs are still too expensive for broad adoption, motivating research into optimizing reactor design, electrolyte formulations, and separation strategies. Accordingly, there is an ongoing, unmet, need for new RFBs.

SUMMARY OF THE INVENTION

In one aspect the present disclosure provides an electrode, comprising a polymer film and a substrate, wherein the polymer film has a thickness of about 5 nm to about 600 nm.

In another aspect the present disclosure provides electrochemical cells comprising an electrode disclosed herein and an electrolyte.

In yet another aspect the present disclosure provides batteries comprising an electrode or electrochemical cell disclosed herein.

In yet another aspect the present disclosure provides methods of making the electrodes disclosed herein.

BRIEF DESCRIPTION OF THE DRAWINGS

FIG. 1A shows that the vapors of monomer (EDOT) and oxidant ($VOCl_3$) insert into the hot-wall oCVD reactor and react spontaneously on a heated substrate in a step-growth fashion to form a conducting PEDOT thin film on the micrometric fibers of the carbon cloth electrode. FIG. 1B shows plan-view SEM images with low (left section) and high (right section) magnification for blank (pristine) carbon electrode. FIG. 1C shows plan-view SEM images with low (left section) and high (right section) magnification for oCVD PEDOT coated carbon electrode. FIG. 1D shows plan-view SEM images with low (left section) and high (right section) magnification for spun-cast PEDOT:PSS coated carbon electrode.

FIG. 2A is a cross-sectional SEM image of oCVD PEDOT coated carbon fiber grown at the deposition temperature of 80° C. FIG. 2B shows the out-of-plane GIXRD θ-2θ diffraction patterns of as-deposited oCVD PEDOT at the fixed $VOCl_3$ vapor saturation ratio and different growth temperature of 80° C. FIG. 2C shows the out-of-plane GIXRD θ-2θ diffraction patterns of as-deposited oCVD PEDOT at the fixed $VOCl_3$ vapor saturation ratio and different growth temperature of 140° C. FIG. 2D shows the XPS analyses of oCVD PEDOT grown on graphene and exposed to the iron chloride electrolyte. The penetration of iron into the oCVD PEDOT film is evinced by peaks at ~724 eV (Fe $2p_{1/2}$) and ~712 eV (Fe $2p_{3/2}$) as shown in the inset. FIG. 2E is an AFM image of PEDOT thin film grown at the deposition temperature of 80° C. with the thickness of ca. 78 nm.

FIG. 3A is a photograph of oCVD PEDOT coated carbon fibers that were directly integrated into an RFB. FIG. 3B is a cyclic voltammogram (CVs) of oCVD PEDOT-coated and pristine electrodes in iron salts in aqueous acidic electrolyte solutions based on HCl The CV illustrates that PEDOT-coated electrodes is electrochemically reactive for iron-based electrolytes. FIG. 3C is a cyclic voltammogram (CVs) of oCVD PEDOT-coated and pristine electrodes in iron salts in aqueous acidic electrolyte solutions based on $H_2SO_4$. The CV illustrates that PEDOT-coated electrodes is electrochemically reactive for iron-based electrolytes.

FIG. 4A is a schematic of single-electrolyte flow cell configuration, using $Fe^{2+}/Fe^{3+}$ as a model redox couple, for evaluating electrode performance. FIG. 4B shows the cell polarization data for 50% state-of-charge (0.25 M $Fe^{2+}$/0.25 M $Fe^{3+}$) at a flow rate of 15 mL $min^{-1}$. FIG. 4C is a Nyquist plot obtained using EIS for oCVD PEDOT and pristine carbon fiber in HCl supporting salt with the same conditions as FIG. 4B. FIG. 4D is a Nyquist plot obtained using EIS for oCVD PEDOT and pristine carbon fiber in $H_2SO_4$ supporting salt with the same conditions as FIG. 4B. FIG. 4E shows the Mass transport overpotential determined from the equivalent circuit as a function of PEDOT layer thickness at two different flow rates (5 and 15 mL $min^{-1}$).

FIG. 5A is a SEM cross-section of oCVD PEDOT-coated carbon fiber after exposure to electrolyte. The electrochemical stability of oCVD PEDOT is readily apparent. FIG. 5B is an EDS mapping of oxygen. FIG. 5C is an EDS mapping of iron. FIG. 5D is a Nyquist plot from electrochemical impedance spectroscopy of a pristine carbon fiber electrode in 0.02, 0.50, and 1.0 M iron chloride. FIG. 5E shows the distribution of ohmic ($R_{106}$), charge-transfer ($R_{CT}$), and mass-transport ($R_{MT}$) resistances based on equivalent circuit fits of Nyquist plots for pristine carbon fiber electrode. FIG. 5F shows the cell polarization at concentrations of 0.02, 0.50, and 1.0 M iron chloride for pristine carbon fiber electrode. FIG. 5G is a Nyquist plot from electrochemical impedance spectroscopy of 202 nm oCVD PEDOT-coated electrode carbon fiber electrode in 0.02, 0.50, and 1.0 M iron chloride. FIG. 5H shows the distribution of ohmic ($R_{106}$), charge-transfer ($R_{CT}$), and mass-transport ($R_{MT}$) resistances based on equivalent circuit fits of Nyquist plots for oCVD PEDOT-coated carbon fiber electrode. FIG. 5I shows the cell polarization at concentrations of 0.02, 0.50, and 1.0 M iron chloride for oCVD PEDOT-coated carbon fiber electrode.

FIG. 6A shows the results of symmetric cell galvanostatic cycling at several current densities in iron chloride of a oCVD PEDOT coated electrode. FIG. 6B shows the results of symmetric cell galvanostatic cycling at several current densities in iron chloride of a pristine electrode. FIG. 6C shows impedance spectroscopy before and after cycling for both oCVD PEDOT and pristine electrodes. FIG. 6D shows the discharge efficiency versus cycle number using theoretical discharge capacity as a basis.

FIG. 7A is a plan-view SEM image of oCVD PEDOT coated carbon electrode. FIG. 7B is a plan-view SEM image of oCVD PEDOT coated carbon electrode. FIG. 7C is a plan-view SEM image of oCVD PEDOT coated carbon electrode. FIG. 7D is a plan-view SEM image of oCVD PEDOT coated carbon electrode. FIG. 7E is a cross-sectional SEM image of oCVD PEDOT coated carbon electrode.

FIG. 12A shows the XRD analyses on oCVD PEDOT thin films grown at the deposition temperature of 80° C. on silicon wafers for pristine oCVD PEDOT, oCVD PEDOT exposed to 2 M HCl, and oCVD PEDOT exposed to 2 M $H_2SO_4$. FIG. 12B shows the high magnification GIXRD patterns around edge-on orientation of the electrode. FIG. 12C shows the high magnification GIXRD patterns around face-on orientation of the electrode.

FIG. 13A shows the cell polarization for 14, 29, 78, 202, 370, and 470 nm thick oCVD PEDOT coatings in 0.5 M iron chloride (50% SOC) 2 M HCl electrolyte at 15 mL $min^{-1}$. FIG. 13B shows the electrochemical impedance spectroscopy for 14, 29, 78, 202, 370, and 470 nm thick oCVD PEDOT coatings in 0.5 M iron chloride (50% SOC) 2 M HCl electrolyte at 15 mL $min^{-1}$.

FIG. 14A shows that the electrochemical stability of PEDOT film after exposing to the iron chloride electrolyte is readily apparent from the cross-sectional SEM image. FIG. 14B shows the elemental EDS mapping for carbon. FIG. 14C shows the elemental EDS mapping for chlorine. FIG. 14D shows the elemental EDS mapping for sulfur.

DETAILED DESCRIPTION OF THE INVENTION

Figure 1A:
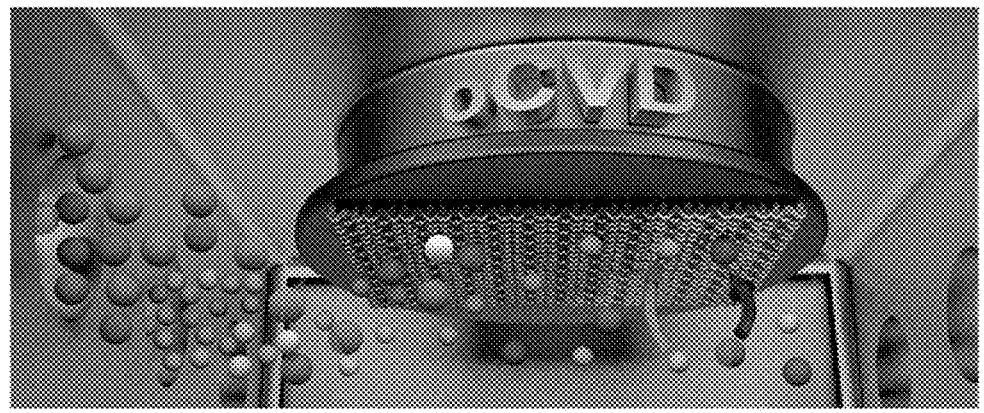
FIGS. 1A-1D show an illustration of the oCVD method that provides ultrathin highly conformal PEDOT film on porous substrates.

The porous carbon electrode is a critical component of the RFB stack, providing active sites for redox reactions, controlling electrolyte distribution and pressure drop, and cushioning compressive forces required to seal the system and minimize contact resistances. While functional, the electrodes used in advanced RFBs, which are typically based on porous carbon and graphite papers, cloths, or felts, generally possess low surface area (ca. 0.1-10 $m^2\ g^{-1}$), spatially-varying surface chemistry, and poor aqueous wettability. To address these limitations, electrodes are commonly oxidatively pretreated, via thermal, electrochemical, or chemical means, which can simultaneously increase surface area and introduce oxygen-rich functionalities on the electrode surface that improve wetting and reaction kinetics. While effective, these methods offer limited control of specific surface chemistry and compositional uniformity across the three-dimensional geometry.

A potentially effective strategy for tailoring electrode-electrolyte interfaces is through the deposition of conductive polymeric overlayers, which have been shown to enhance the areal energy and power density by improving pseudocapacitance in supercapacitors and stabilize the structure and thermal stability of the electrode-electrolyte interface in lithium-ion batteries with nickel-rich positive electrodes. These studies utilized continuous polymer layers, as thin as 3 nm, grown by oxidative chemical vapor deposition (oCVD) to support facile electrical and ionic conduction. In contrast to solution-applied layers, the oCVD films conformally encapsulated the nanostructured surfaces, leaving void space to enable changes in polymer layer thickness upon ion-exchange without the development of significant mechanical strain. Additionally, conformal coverage maintains high surface area for effective contact with the electrolyte.

Herein the potential of oCVD processing to improve the performance of carbon-fiber based electrodes in aqueous RFBs is demonstrated. Poly(3,4-ethylenedioxythiophene) (PEDOT), which is the most extensively studied oCVD polymer to date. The oCVD approach provides remarkable capabilities for nanoscale control of thickness and crystallographic texture. The composition and properties of oCVD PEDOT are distinct from spin-applied PEDOT:PSS (polystyrene sulfonate). In this work, the dopant species for the oCVD PEDOT is the small anion, Cl⁻, whose greater mobility than PSS has been shown promotes ion-exchange in the film resulting in electrochemical activity. Additionally, the electrical conductivity of oCVD PEDOT can exceed 6000 S/cm, several orders of magnitude higher than pristine PEDOT:PSS. Previous work demonstrated the ability to grow ultrathin, durable, and conformal PEDOT layers over the geometrically complex carbon cloth surfaces.

Disclosed herein are oCVD PEDOT modified carbon cloth electrodes in electrolytes utilized in RFBs. A comprehensive set of spectroscopic techniques is used to assess the morphological, chemical, and structural characteristics of the oCVD PEDOT films. Using cyclic voltammetry, it is shown that the PEDOT coated electrode is electrochemically active in quiescent iron electrolytes containing both chloride and sulfate supporting salts. In a single-electrolyte diagnostic flow cell, the performed of oCVD PEDOT modified electrodes is examined using polarization and assess sources of overpotential losses via impedance spectroscopy, revealing that PEDOT films mitigate ohmic, kinetic, and mass transport losses. By varying the thickness, it is shown that the mass transport through the film is dependent on both flow rate and thickness; the role of mass transfer is also studied by varying electrolyte concentration in iron chloride electrolyte. Ultimately, the potential of oCVD processes in tuning the performance of porous carbon electrodes is demonstrated.

In one aspect the present disclosure provides an electrode, comprising a polymer film and a substrate, wherein the polymer film has a thickness of about 5 nm to about 600 nm. In certain embodiments, the polymer film comprises poly(3,4-ethylene dioxythiophene) (PEDOT), polyaniline, polypyrrole, or polythiphene. In certain embodiments, the polymer film comprises poly(3,4-ethylene dioxythiophene) (PEDOT).

In another aspect the present disclosure provides an electrode, comprising a polymer film and a substrate, wherein the polymer film has a thickness of about 5 nm to about 600 nm; and the structure of the electrode does not comprise liquid-bridging or delamination.

In certain embodiments, the substrate is porous. In certain embodiments, the substrate is not a metal oxide. In certain embodiments, the substrate is not a layer of lithium metal oxide. In certain embodiments, the substrate is carbonaceous. In certain embodiments, the substrate is carbon cloth, carbon nanotubes, carbon paper, or graphene. In certain embodiments, the substrate is carbon black or an ionomer agglomerates. In certain embodiments, the substrate is carbon cloth. In certain embodiments, the substrate is not carbonaceous. In certain embodiments, the substrate is a silicon wafer, a trench wafer, a metal foam, or a metal mesh. In certain embodiments, the metal foam or metal mesh comprises nickel, platinum, titanium, or a combination thereof (e.g., platinized titanium).

In certain embodiments, the structure of the substrate comprises a plurality of pores. In certain embodiments, the plurality of pores has an average diameter of from about 1 nm to about 1 mm. In certain embodiments, the plurality of pores has an average diameter of from about 1 nm to about 1,000 nm. In certain embodiments, the plurality of pores has an average diameter of from about 1 nm to about 500 nm. In certain embodiments, the plurality of pores has an average diameter of from about 1 μm to about 1,000 μm. In certain embodiments, the plurality of pores has average diameter of from about 1 mm to about 5 mm. In certain embodiments, the average distance between each pore is from about 1 nm to about 1,000 nm. In certain embodiments, the average distance between each pore is from about 50 nm to about 300 nm.

In certain embodiments, the polymer film has a thickness of about 10 nm to about 300 nm. In certain embodiments, the polymer film has a thickness of about 50 nm to about 150 nm. In certain embodiments, the polymer film has a thickness of about 50 nm to about 100 nm.

In certain embodiments, the polymer film has a thickness of about 10 nm, about 25 nm, about 50 nm, about 75 nm, about 100 nm, about 125 nm, about 150 nm, about 175 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, or about 575 nm. In certain embodiments, the polymer film has a thickness of about 50 nm, about 75 nm, or about 100 nm. In certain embodiments, the polymer film has a thickness of about 75 nm.

In certain embodiments, the polymer film consists essentially of PEDOT. In certain embodiments, the polymer film consists of PEDOT.

In certain embodiments, the polymer film further comprises a dopant. In certain embodiments, the polymer film consists essentially of PEDOT and a dopant.

In certain embodiments, the dopant is an acid. In certain embodiments, the dopant is a Bronsted acid. In certain embodiments, the dopant is HX; and X is halide (e.g., Cl—) or sulfate (e.g., $SO_4^{2-}$). In certain embodiments, the dopant is a halide (e.g., Cl⁻).

In certain embodiments, the structure of the polymer film comprises a plurality of pores. In certain embodiments, the average diameter of the plurality of pores in the film is from about 100 nm to about 1,000 nm.

In certain embodiments, the structure of the polymer film comprises a plurality of nodules. In certain embodiments, the average height of the plurality of nodules is from about 100 nm to about 1000 nm.

In certain embodiments, the structure of the electrode consists essentially of a plurality of fibrils or fibers. In certain embodiments, the structure of the electrode consists essentially of a plurality of fibers. In certain embodiments, the structure of the electrode consists essentially of a plurality of fibrils or fibers and a plurality of crystallites. In certain embodiments, the structure of the electrode consists essentially of a plurality of fibers and a plurality of crystallites. In certain embodiments, the structure of the electrode comprises a plurality of fibrils or a plurality of fibers. In certain embodiments, the average length of the plurality of fibrils or fibers is from about 10 nm to about 250 nm. In certain embodiments, the average length of the plurality of fibrils or fibers is from about 20 nm to about 130 nm. In certain embodiments, the average void space between each the plurality of fibrils or fibers is about 50 μm to about 150 μm. In certain embodiments, the average void space between the plurality of fibrils or fibers is about 50 μm, 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, or about 150. In certain embodiments, the average void space between the plurality of fibrils or fibers is about 85 μm.

In certain embodiments, the structure of the electrode further comprises crystallites. In certain embodiments, the length of the crystallites in the a-axis direction (edge-on orientation) is about 5 nm to about 10 nm. In certain embodiments, length of the crystallites in the a-axis direction (edge-on orientation) is about 5 nm, about 6 nm, about 7 nm, about 8 nm, about 9 nm, or about 10 nm. In certain embodiments, the length of the crystallites in the a-axis direction (edge-on orientation) is about 5 nm, about 5.5 nm, about 6 nm, about 6.5 nm, about 7.0 nm, about 7.5 nm, or about 8.0 nm. In certain embodiments, the length of the crystallites in the a-axis direction (edge-on orientation) is about 5.7 nm. In certain embodiments, the length of the crystallites in the a-axis direction (edge-on orientation) is about 6.0 nm. In certain embodiments, the length of the crystallites in the a-axis direction (edge-on orientation) is about 7.6 nm.

In certain embodiments, the structure of the electrode does not comprise liquid-bridging or delamination. In certain embodiments, the structure of the electrode is ordered or uniform. In certain embodiments, the structure of the electrode is uniform.

In certain embodiments, the advancing water contact angle of the electrode is about 50° to about 70°. In certain embodiments, the advancing water contact angle of the electrode is about 60° to about 65°. In certain embodiments, the advancing water contact angle of the electrode is about 54°, about 56°, about 58°, about 60°, about 62°, about 64°, or about 66°. In certain embodiments, the advancing water contact angle of the electrode is about 62°.

In certain embodiments, the receding water contact angle of the electrode is about 10° to about 30°. In certain embodiments, the receding water contact angle of the electrode is about 15° to about 25°. In certain embodiments, the receding water contact angle of the electrode is about 16°, about 18°, about 20°, about 22°, about 24°, or about 26°. In certain embodiments, the receding water contact angle of the electrode is about 22°.

In certain embodiments, the electrode is formed by oxidative chemical vapor deposition.

In yet another aspect the present disclosure provides an electrode, comprising a polymer film and a substrate, wherein the polymer film has a thickness of about 5 nm to about 600 nm; and the structure of the electrode is uniform.

In yet another aspect the present disclosure provides an electrode formed by oxidative vapor deposition (oCVD), comprising a polymer film and a substrate, wherein the polymer film has a thickness of about 5 nm to about 600 nm.

In another aspect, present disclosure provides an electrode comprising a polymer film and a substrate, wherein the polymer film comprises poly(3,4-ethylene dioxythiophene) (PEDOT) and the polymer film has a thickness of from about 5 nm to about 600 nm.

In another aspect, present disclosure provides an electrode comprising a polymer film and a substrate, wherein the polymer film comprises poly(3,4-ethylene dioxythiophene) (PEDOT); the polymer film has a thickness of from about 5 nm to about 600 nm; and the structure of the electrode does not comprise liquid-bridging or delamination.

In another aspect, present disclosure provides an electrode comprising a polymer film and a substrate, wherein the polymer film comprises poly(3,4-ethylene dioxythiophene) (PEDOT); the polymer film has a thickness of from about 5 nm to about 600 nm; and the structure of the electrode is uniform.

In another aspect, present disclosure provides an electrode formed by oxidative vapor deposition (oCVD), comprising a polymer film and a substrate, wherein the polymer film comprises poly(3,4-ethylene dioxythiophene) (PEDOT) and the polymer film has a thickness of from about 5 nm to about 600 nm.

In yet another aspect the present disclosure provides electrochemical cells comprising an electrode disclosed herein and an electrolyte.

In certain embodiments, the electrolyte is aqueous. In certain embodiments, the aqueous electrolyte comprises iron, vanadium, chromium, bromine, or cerium.

In certain embodiments, the aqueous electrolyte further comprises a supporting salt. In certain embodiments, the supporting salt comprises chloride or sulfate.

In certain embodiments, the aqueous electrolyte has an acidic pH. In certain embodiments, the aqueous electrolyte has a neutral pH. In certain embodiments, the aqueous electrolyte has a basic pH.

In certain embodiments, the electrochemical cell has reduced ohmic limitations as compared to an electrochemical cell that does not comprise an electrode disclosed herein.

In certain embodiments, the electrochemical cell has reduced kinetic limitations as compared to an electrochemical cell that does not comprise an electrode disclosed herein.

In certain embodiments, the electrochemical cell has reduced mass transport limitations as compared to an electrochemical cell that does not comprise an electrode disclosed herein.

In certain embodiments, the electrochemical cell is more durable as compared to an electrochemical cell that does not comprise an electrode disclosed herein.

In certain embodiments, the non-aqueous electrolyte further comprises a supporting salt. In certain embodiments, the supporting salt comprises an ammonium salt (e.g., tetraethylammonium tetrafluoroborate).

In certain embodiments, the electrolyte is non-aqueous. In certain embodiments, the non-aqueous electrolyte comprises vanadium acetylacetonate or TEMPO, or a viologen (e.g., paraquat).

In yet another aspect the present disclosure provides batteries comprising an electrode or electrochemical cell disclosed herein.

In yet another aspect, the present disclosure provides methods of making the electrode of the disclosure, comprising: providing a substrate; contacting the substrate with ethylenedioxythiophene and an oxidant at first temperature; and reducing the first temperature to a second temperature, thereby forming the electrode of the disclosure.

In certain embodiments, the oxidant is an inorganic oxidant. In certain embodiments, the oxidant is $VOCl_3$, $SbCl_5$, or $FeCl_3$. In certain embodiments, the oxidant is $VOCl_3$.

In certain embodiments, the first temperature is about 150° C. to about 250° C. In certain embodiments, the first temperature is about 175° C. to about 225° C. In certain embodiments, the first temperature is about 170° C., about 180° C., about 190° C., about 200° C., about 210° C., about 220° C. or about 230° C. In certain embodiments, the first temperature is 200° C.

In certain embodiments, the second temperature is about 50° C. to about 175° C. In certain embodiments, the second temperature is about 75° C. to about 150° C. In certain embodiments, the second temperature is about 70° C., about 80° C., about 90° C., about 100° C., about 110° C., about 120° C., about 130° C., about 140° C. or about 150° C. In certain embodiments, the second temperature is about 80° C. In certain embodiments, the second temperature is about 140° C.

In certain embodiments, the method is performed at a pressure of about 1 Torr.

In certain embodiments, the method further comprises contacting the electrode with a dopant (e.g., a dopant disclosed herein).

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well-known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, MA (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, Calif. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—CH$_2$—O-alkyl, —OP(O)(O-alkyl)$_2$ or —CH$_2$-OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to C$_1$-C$_{10}$ straight-chain alkyl groups or C$_1$-C$_{10}$ branched-chain alkyl groups. Preferably, the "alkyl" group refers to C$_1$-C$_6$ straight-chain alkyl groups or C$_1$-C$_6$ branched-chain alkyl groups. Most preferably, the "alkyl" group refers to C$_1$-C$_4$ straight-chain alkyl groups or C$_1$-C$_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In preferred embodiments, a straight chain or branched chain alkyl has 30 or fewer carbon atoms in its backbone (e.g., C$_{1-30}$ for straight chains, C$_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "C$_{x-y}$" or "C$_{x-y}$", when used in conjunction with a chemical moiety, such as, acyl, acyloxy, alkyl, alkenyl, alkynyl, or alkoxy is meant to include groups that contain from x to y carbons in the chain. Coalkyl indicates a hydrogen where the group is in a terminal position, a bond if internal. A C$_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS-.

The term "amide", as used herein, refers to a group

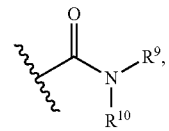

wherein R$^9$ and R$^{10}$ each independently represent a hydrogen or hydrocarbyl group, or R$^9$ and R$^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

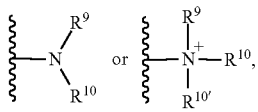

wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably, the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

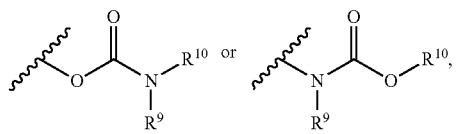

wherein $R^9$ and $R^{10}$ independently represent hydrogen or a hydrocarbyl group.

The term "carbocyclylalkyl", as used herein, refers to an alkyl group substituted with a carbocycle group.

The term "carbocycle" includes 5-7 membered monocyclic and 8-12 membered bicyclic rings. Each ring of a bicyclic carbocycle may be selected from saturated, unsaturated and aromatic rings. Carbocycle includes bicyclic molecules in which one, two or three or more atoms are shared between the two rings. The term "fused carbocycle" refers to a bicyclic carbocycle in which each of the rings shares two adjacent atoms with the other ring. Each ring of a fused carbocycle may be selected from saturated, unsaturated and aromatic rings. In an exemplary embodiment, an aromatic ring, e.g., phenyl, may be fused to a saturated or unsaturated ring, e.g., cyclohexane, cyclopentane, or cyclohexene. Any combination of saturated, unsaturated and aromatic bicyclic rings, as valence permits, is included in the definition of carbocyclic. Exemplary "carbocycles" include cyclopentane, cyclohexane, bicyclo [2.2.1]heptane, 1,5-cyclooctadiene, 1,2,3,4-tetrahydronaphthalene, bicyclo[4.2.0]oct-3-ene, naphthalene and adamantane. Exemplary fused carbocycles include decalin, naphthalene, 1,2,3,4-tetrahydronaphthalene, bicyclo[4.2.0]octane, 4,5,6,7-tetrahydro-1H-indene and bicyclo[4.1.0]hept-3-ene. "Carbocycles" may be substituted at any one or more positions capable of bearing a hydrogen atom.

The term "carbocyclylalkyl", as used herein, refers to an alkyl group substituted with a carbocycle group.

The term "carbonate" is art-recognized and refers to a group —$OCO_2$—.

The term "carboxy", as used herein, refers to a group represented by the formula —$CO_2H$.

The term "ester", as used herein, refers to a group —$C(O)OR^9$ wherein $R^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO$_3$H, or a pharmaceutically acceptable salt thereof.

The term "sulfonamide" is art-recognized and refers to the group represented by the general formulae

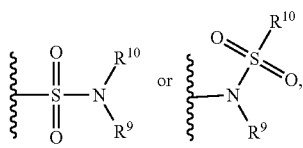

wherein $R^9$ and $R^{10}$ independently represents hydrogen or hydrocarbyl.

The term "sulfoxide" is art-recognized and refers to the group -S(O)—.

The term "sulfonate" is art-recognized and refers to the group SO$_3$H, or a pharmaceutically acceptable salt thereof.

The term "sulfone" is art-recognized and refers to the group —S(O)$_2$—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR$^9$ or —SC(O)R$^9$ wherein R$^9$ represents a hydrocarbyl.

The term "thioether", as used herein, is equivalent to an ether, wherein the oxygen is replaced with a sulfur.

The term "urea" is art-recognized and may be represented by the general formula

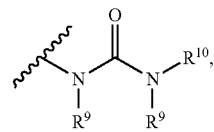

wherein R$^9$ and R$^{10}$ independently represent hydrogen or a hydrocarbyl.

Many of the compounds useful in the methods and compositions of this disclosure have at least one stereogenic center in their structure. This stereogenic center may be present in a R or a S configuration, said R and S notation is used in correspondence with the rules described in Pure Appl. Chem. (1976), 45, 11-30. The disclosure contemplates all stereoisomeric forms such as enantiomeric and diastereoisomeric forms of the compounds, salts, prodrugs or mixtures thereof (including all possible mixtures of stereoisomers). See, e.g., WO 01/062726.

Furthermore, certain compounds that contain alkenyl groups may exist as Z (zusammen) or E (entgegen) isomers. In each instance, the disclosure includes both mixture and separate individual isomers.

Some of the compounds may also exist in tautomeric forms. Such forms, although not explicitly indicated in the formulae described herein, are intended to be included within the scope of the present disclosure.

EXAMPLES

The invention now being generally described, it will be more readily understood by reference to the following examples, which are included merely for purposes of illustration of certain aspects and embodiments of the present invention, and are not intended to limit the invention.

Example 1: Preparation of Exemplary Electrodes oCVD PEDOT Synthesis

The inside look of oCVD reactor configuration is described in FIG. 1a and details schematic illustration with all accessories is depicted elsewhere. Typically, the step-growth polymerization in oCVD method, known as a surface process, proceeds in three steps: (i) oxidation to form radical cations, (ii) dimerization of cation radical, and (iii) deprotonation to form conjugation. The monomer (3,4-ethylenedioxythiophene (EDOT), 97%) and oxidant (vanadium oxytrichloride ($VOCl_3$), 99%) were purchased from Sigma-Aldrich and used without further purification. The EDOT and $VOCl_3$ were evaporated at the temperature of 140° C. and 30° C., respectively. The temperature of vapor delivery lines for monomer and oxidant were kept constant at 160° C. and 50° C., respectively. The reactor body temperature was held at 200° C. The flow rates were regulated by needle valves and were maintained at the fixed value of at 12 sccm and 9 sccm, respectively. The reactor pressure was kept constant at 1 Torr. The oCVD PEDOT films were grown at the deposition temperature of 80° C. and 140° C. The saturation vapor pressures of reactants were obtained using the Clausius-Clapeyron equation and the extracted $P/P_{sat}$ values were inserted in Table S1. The resultant oCVD PEDOT thin films were subsequently removed from the reactor and exploiting into the flow battery device without any post-deposition methanol (MeOH) or acidic rinsing treatment.

Example 2: Characterization and Performance of Exemplary Electrodes

A conceptual image of PEDOT thin film deposition by the oCVD method is shown in FIG. 1A. The monomer (EDOT) and oxidant ($VOCl_3$) species are introduced into a hot-wall vacuum reactor and strike on the surface of the temperature-controlled substrate through the vapor phase. The polymerization of conducting polymer in the oCVD method proceeds through the step-growth mechanism and the increase in molecular weight occurs geometrically through the formation of dimers, tetramers, and high 2N-mers. Here, the growth temperature and film thickness of PEDOT, at the fixed monomer and oxidant flow rates into the reactor, are the primary variables for synthesizing and tuning oCVD PEDOT film properties. Experimental details and information related to the equilibrium surface concentration of the reactants, determined from the saturation ratio ($P/P_{sat}$, where P and $P_{sat}$ are partial pressure and saturation pressure, respectively), are provided in Table S1.

Figure 1B:
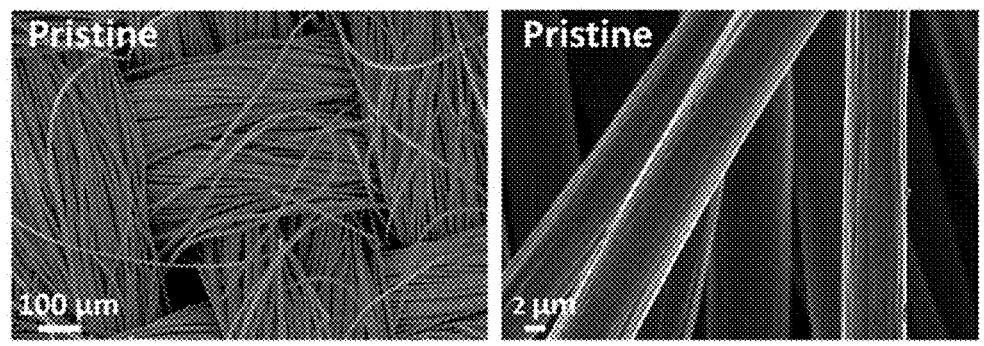
Figure 1C:
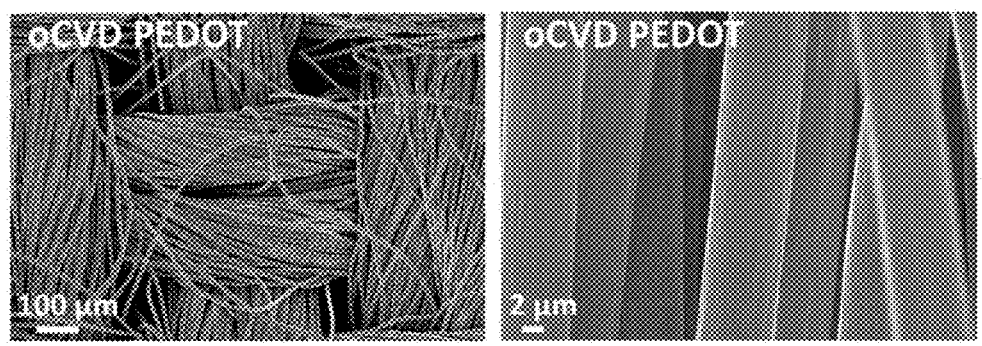
Figure 1D:
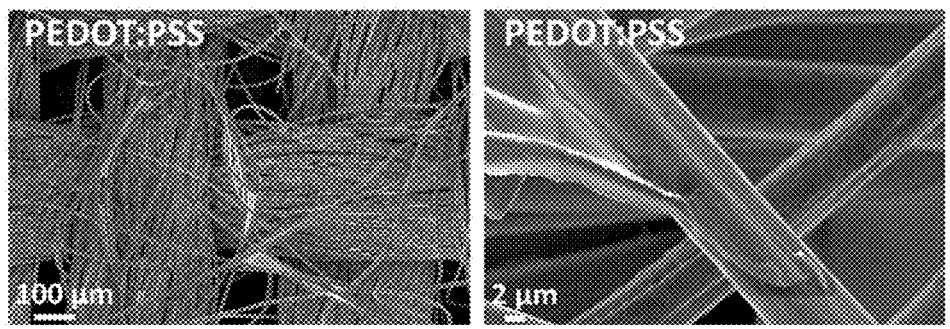

The morphology of pristine, oCVD-coated PEDOT, and spin-coated PEDOT:PSS carbon cloth electrodes are shown in FIGS. 1B-1D. Carbon cloth electrodes (specifically untreated AvCarb 1071) were chosen as model porous carbon electrodes for this study due to their well-defined bimodal and binder-less woven structure, thus avoiding extraneous factors in subsequent analysis of oCVD PEDOT-coatings. The uncoated carbon fibers are ~8 μm fibers in diameter (FIG. 1B). As predicted, the vapor deposition of PEDOT via oCVD yields uniform and highly conformal coating that retains the fibrillar nature of the carbon fibers (FIG. 1C). However, the spun-cast PEDOT:PSS coated carbon fibers (FIG. 1D) exhibits disadvantages, including liquid bridging, non-conformality, and delamination. In contrast to the spin-coated method, the formation of conformal coating by the oCVD method on any porous and non-planar surfaces is due to the absence of surface tension effects such as liquid-thinning, air gap formation, bridging, and meniscus formation.

Figure 2A:
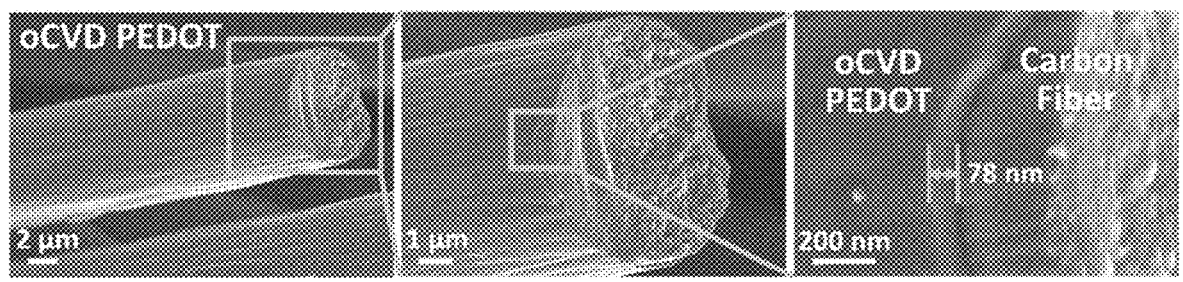
FIGS. 2A-2E show the structural characteristics of oCVD PEDOT film.
Figure 7A:
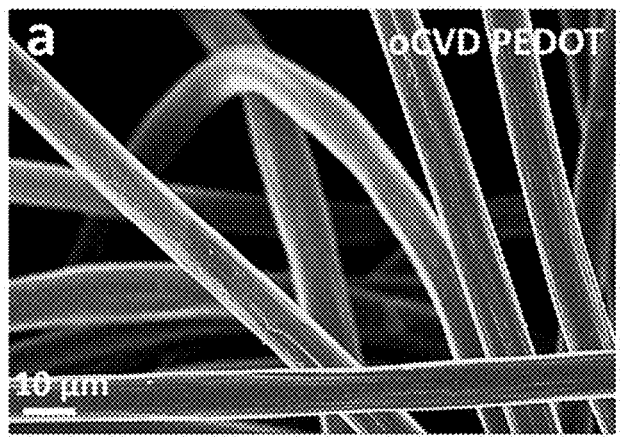
FIGS. 7A-7E show ultrathin conformal coverage of oCVD PEDOT thin film on carbon fibers.
Figure 7B:
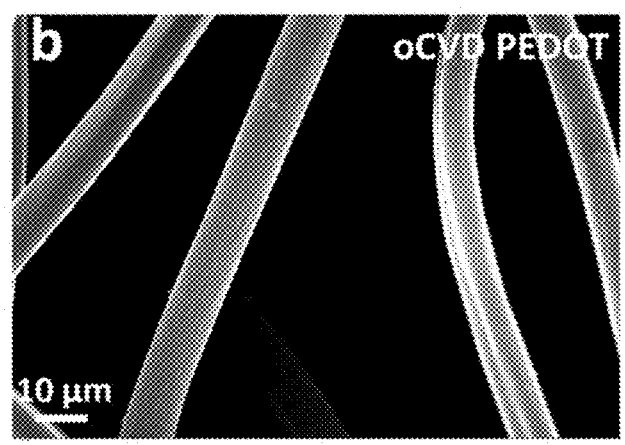
Figure 7C:
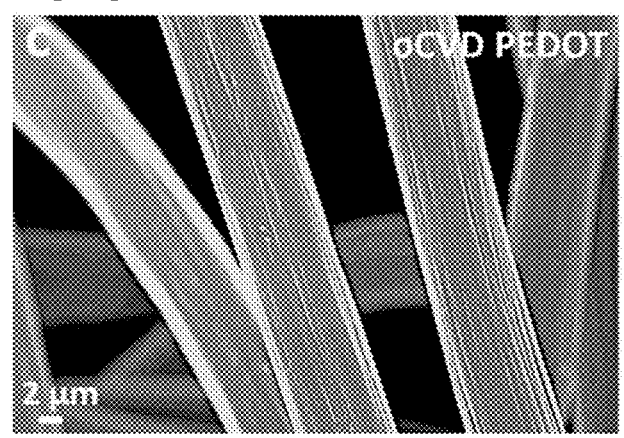
Figure 7D:
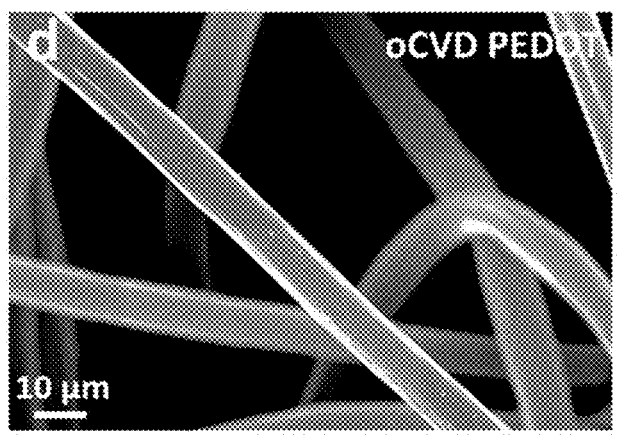
Figure 7E:
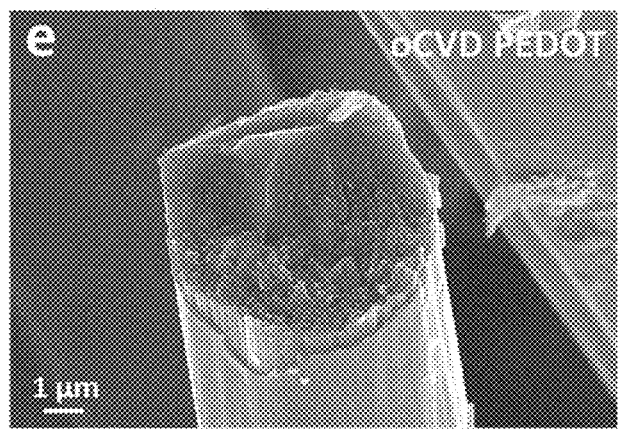

FIG. 2A further demonstrates the high conformality of oCVD PEDOT on carbon fibers via cross-sectional scanning electron microscopy (SEM) images; additional micrographs displaying the conformality of the coatings on porous carbon fibers can be found in FIG. 7A. The oCVD method also provides remarkable capabilities for control of conformal PEDOT thickness in various porous structures. The thickness of conformally coated oCVD PEDOT thin films and penetration depth of reactants throughout the mesh electrode thickness can be adjusted by tuning the saturation ratio of oxidant and monomer. The aspect ratio (height/width ratio) in the case of carbon cloth electrode can be estimated by dividing the half-thickness of carbon cloth to the average characteristics length of spacing between fibers $$\left(\sim \frac{1/2(0.38 \text{ mm})}{12 \text{ }\mu m} \cong 16\right).$$

The half-thickness of carbon cloth is considered as a consequence of the availability of the reactants vapor species on both sides of carbon cloth due to (i) presence of a gap between heated substrate and sample, (ii) existence of large void space between each carbon bundle with the average size of ~85 and (iii) constitution of cloth thickness with upper and lower wounded bundles. While measuring the penetration depth directly on the carbon cloth is experimentally challenging, the penetration depth can be estimated from measurements taken on more controlled geometries such as trench wafers. Recently, the conformality of oCVD PEDOT thin film grown with the volatile oxidant, such as $VOCl_3$, on the trench wafer with the aspect ratio of ~11 (height and width of 7.5 and 0.7 μm, respectively) is demonstrated. It is noteworthy to mention that a high degree of penetration would be expected in the case of porous structure. A high degree of penetration and deposition of ultrathin conformal oCVD PEDOT film is reported in aligned carbon nanotubes (A-CNTs) with an extremely high aspect ratio of 10,000.

Figure 8:
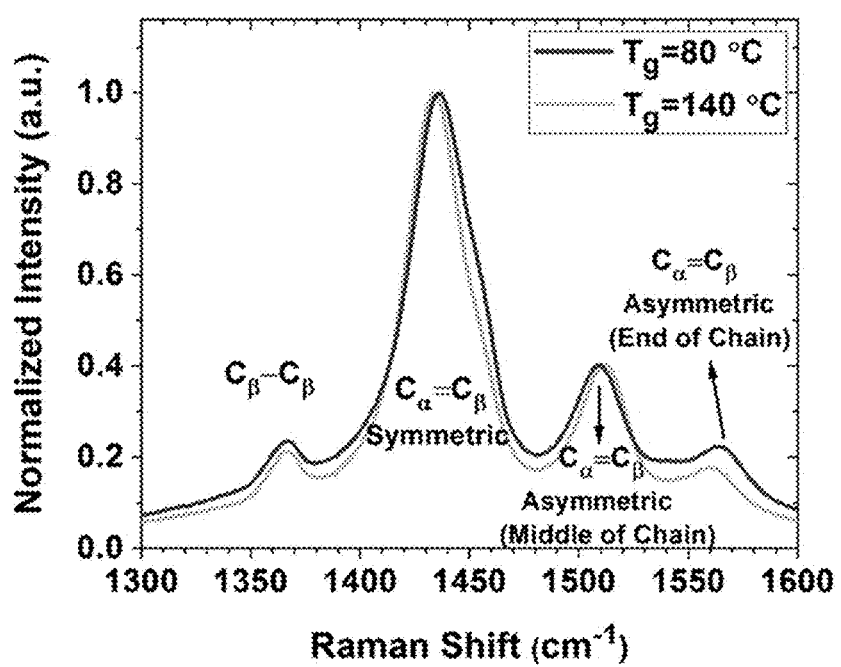
FIG. 8 shows raman analysis of oCVD PEDOT films. Raman spectra for the PEDOT films grown at the deposition temperature of 80° C. and 140° C. The peaks exhibit almost identical symmetry and asymmetry carbon-carbon (CC) stretching, indicating a consistent chemical structure for the oCVD PEDOT films. The peaks at 1365, 1432, 1510, and 1565 $cm^{-1}$ for PEDOT film are attributed to $C_\beta$-$C_\beta$ stretching vibration, $C_\alpha$=$C_\beta$ symmetric stretching vibration on the thiophene ring, $C_\alpha$=$C_\beta$ asymmetric stretching vibration at the middle and end of the thiophene chain, respectively.
Figure 9:
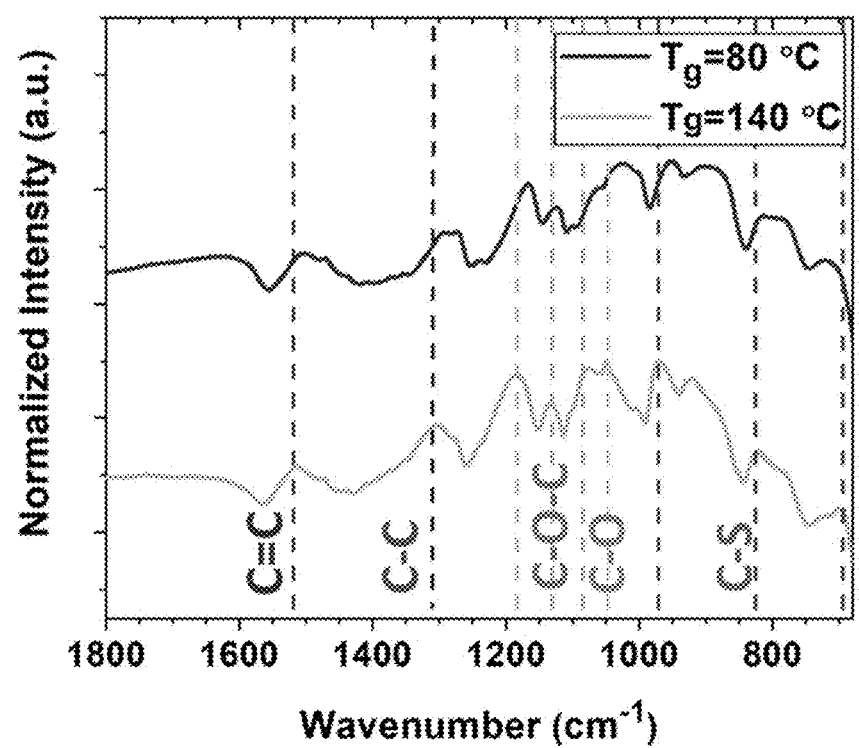
FIG. 9 shows ATR-FTIR analysis of oCVD PEDOT films. The ATR-FTIR spectra of oCVD PEDOT films grown at the deposition temperature of 80° C. and 140° C., while keeping the $VOCl_3$ vapor saturation ratio fixed at each growth temperature. The vibration mode of C=C and C—C bonds in thiophene rings, C—O—C bond in the ethylenedioxy group, C—O bond in the ethylenedioxy group, and C—S bond in the polymerized PEDOT chains are labeled in the figure.

Achieving conformal PEDOT coating by oCVD method has two significant advantages compared to the PEDOT:PSS solution-applied process in electrochemical applications; (i) maintaining a high surface area for effective contact with the electrolyte, and (ii) enabling changes in polymer thickness upon ion-exchange without the development of significant mechanical strain by leaving void space open throughout the mesh electrode thickness. In addition, the oCVD PEDOT has another significant advantage over its PEDOT:PSS counterpart in electrochemical applications, due to its unique doping process. The small anion dopant, here Cr, makes oCVD PEDOT films compositionally distinct from spun-cast PEDOT:PSS. The small anion dopants of oCVD PEDOT more readily undergo redox exchange than the large macromolecular dopant of PSS, bringing an advantage in electrochemical applications compared to PEDOT:PSS. The Raman analyses (FIG. 8) and attenuated total reflection-Fourier transform infrared (ATR-FTIR) spectroscopy (FIG. 9) confirm the polymerization and no significant structural bond changes in oCVD PEDOT films grown at different process conditions. Therefore, the texture and nanostructure of PEDOT films govern the electrical conductivity, which is in consonance with previous studies.

Figure 2B:
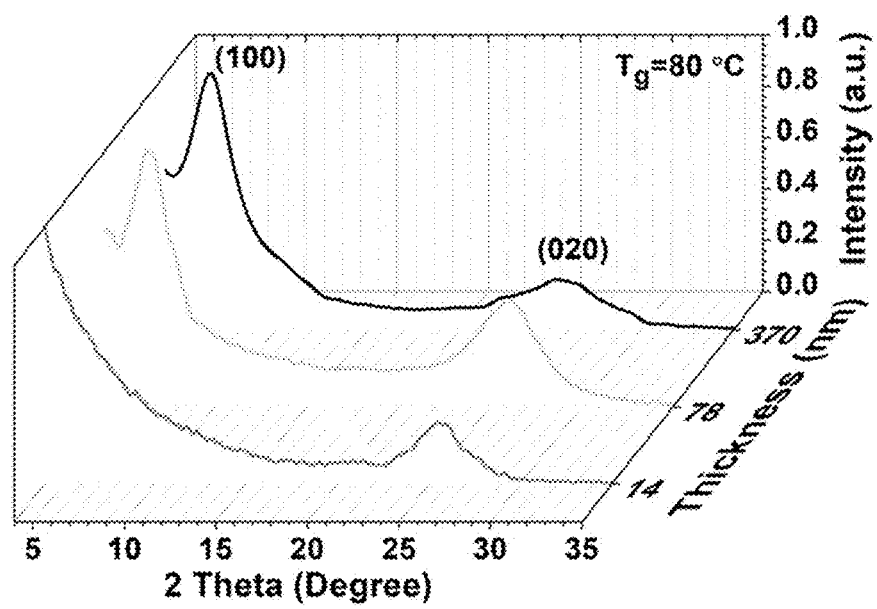
Figure 2C:
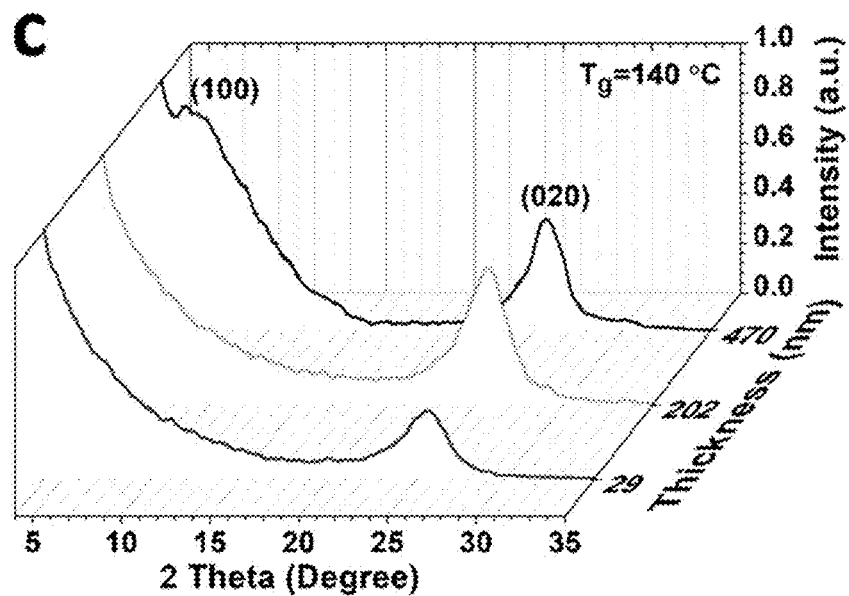

The grazing incidence X-ray diffraction (GIXRD) patterns reveal that the resulting oCVD PEDOT films, grown on silicon wafers as reference samples, have an excellent ordered structure with different preferential semi-crystalline orientation (FIGS. 2B & 2C). The diffraction of (100) and (020) planes at 2θ values of ca. 6.4° and 25.5° correspond to the edge-on and face-on orientations, respectively. The conjugated backbone is parallel to the surface substrate in both orientations and the only difference is related to the orientation of the π-π interchain stacking, which is perpendicular and parallel to the surface substrate in face-on and edge-on orientation, respectively.

The extracted a-axis and b-axis lattice parameters were in the range of 13.80-13.84 Å and 6.97-6.99 Å, respectively. Lorentz Polarization (LP) factor, defined as:

$$LP(\theta) = \frac{1+\cos^2(2\theta)}{\sin^2(\theta)\cos(\theta)},$$

was used to quantify the percentage of preferential orientation (Table S2). The change in crystallization orientation, as a function of growth temperature and film thickness, is attributed to the intermolecular interaction and energy minimization of growing film and interfaces. The obtained in-plane electrical conductivity of these samples with different preferential orientations are shown in Table S2 with higher conductivities observed for films with greater fractions of face-on orientation.

Normally, face-on orientation correlates with the low energy barrier of intercrystallite charge transport and induces the high in-plane carrier mobility and electrical conductivity. Typically, there is a trade-off between in-plane and out-of-plane electrical conductivity in conducting polymers and the sample with high in-plane conductivity exhibits its low out-of-plane conductivity and vice versa.

Figure 2D:
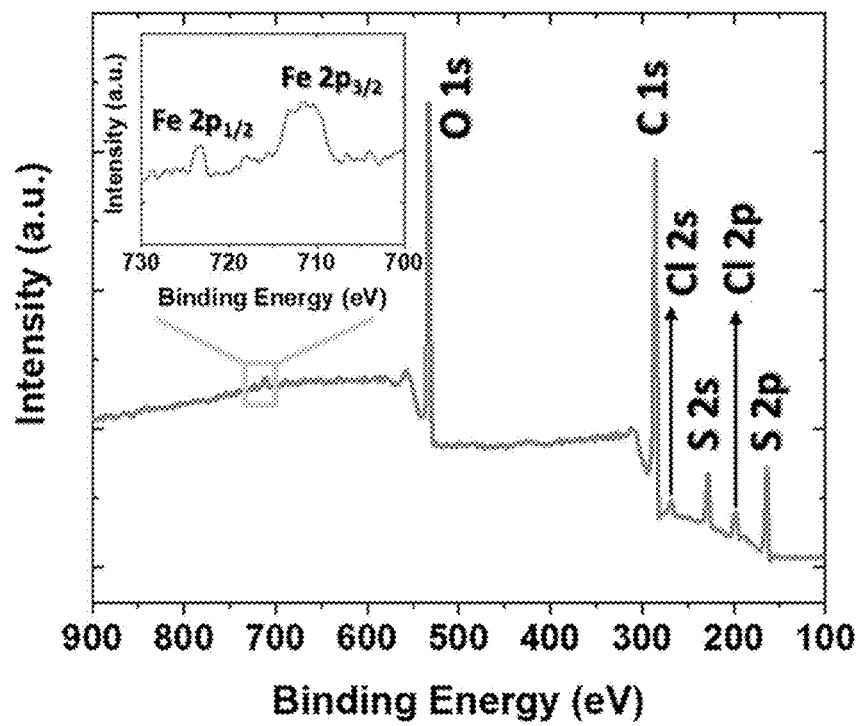

To better understand the role of the PEDOT film chemical composition on electrochemistry, X-ray photoelectron spectroscopy (XPS) analysis was performed on the oCVD PEDOT coated planar substrate of graphene after overnight exposure to the iron chloride electrolyte (FIG. 2D), with actives concentration of 0.5 M at 50% state-of-charge (SoC) in 2 M HCl To overcome the shadowing effects of carbon fibers, deposited oCVD PEDOT was deposited onto ten monolayers of graphene (FIG. 10) and XPS analysis was carried out on the coated graphene sample after exposure to the electrolyte. The iron penetration into the oCVD PEDOT thin film can be noted based on the appeared peaks with low intensities at ca. 712 eV and 724 eV, which are related to the Fe $2p_{3/2}$ and Fe $2p_{1/2}$, respectively. The elemental composition was estimated from the XPS spectra of pristine PEDOT (FIG. S5) and exposed PEDOT film to the electrolyte (FIG. 2D) and summarized in Table S3. In addition to the presence of iron, elemental analysis reveals that the ratio of chlorine/sulfur (Cl/S), an indication of doping level, slightly decreases from its initial as-grown value of 0.37 to 0.30 after exposing to the electrolyte.

Figure 2E:
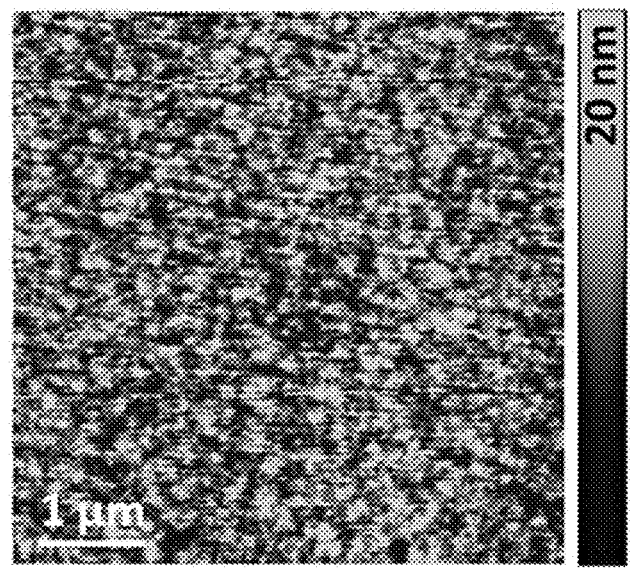

The surface topography of the oCVD PEDOT film grown at the deposition temperature of 80° C. with the thickness of ca. 78 nm is evaluated by atomic force microscopy (AFM) and is depicted in FIG. 2E. The extracted surface roughness of oCVD PEDOT thin film was ca. 2.1 nm. The wetting properties of planar oCVD PEDOT thin films were previously investigated and exhibited the advancing water contact angle (WCA) of 62° and receding WCA of 22°. Generally, in PEDOT thin films, the WCA depends on the root mean square (rms) roughness and the morphology of the surface based on the Cassie-Baxter equation. The series of PEDOT thin films with different thickness grown with the same oxidant by the oCVD method exhibited approximately the same rms values, suggesting that the wetting properties were similar for the coated electrodes in this study. The film surface smoothness is of importance for some applications, such as avoidance of unwanted current leakage from inter-electrode shorting within photovoltaics, but is anticipated to be of less relevance to RFB applications.

Figure 3A:
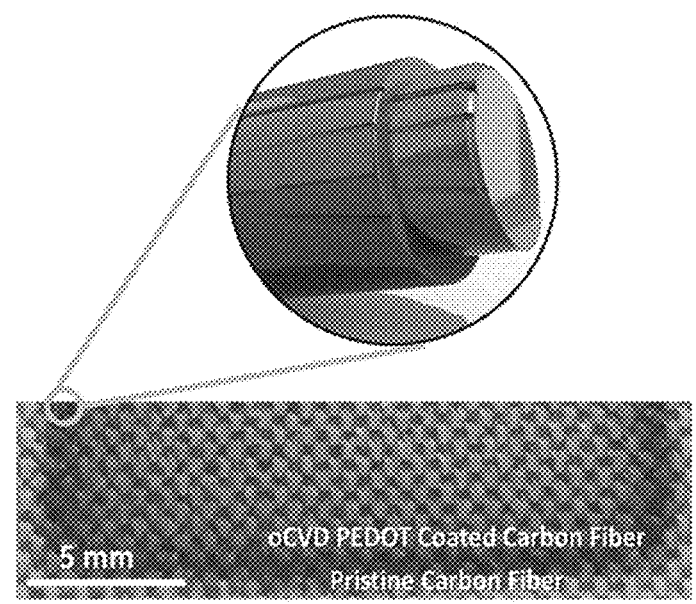
FIGS. 3A-3C show an ex-situ demonstration of oCVD PEDOT-coated electrodes in iron salts.
Figure 3B:
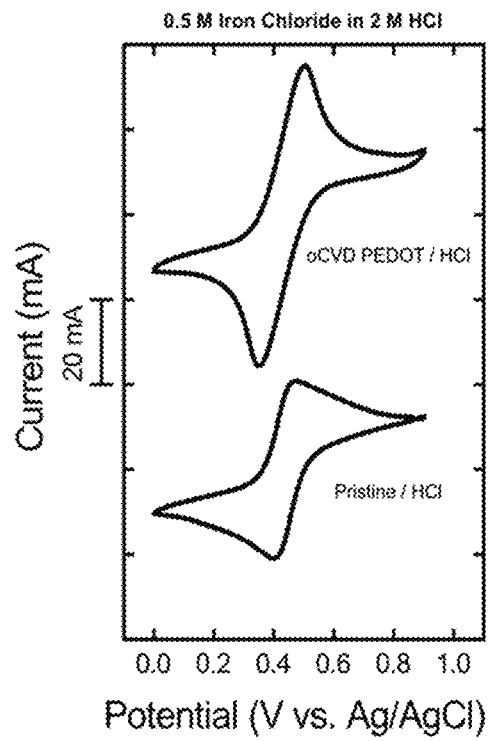
Figure 3C:
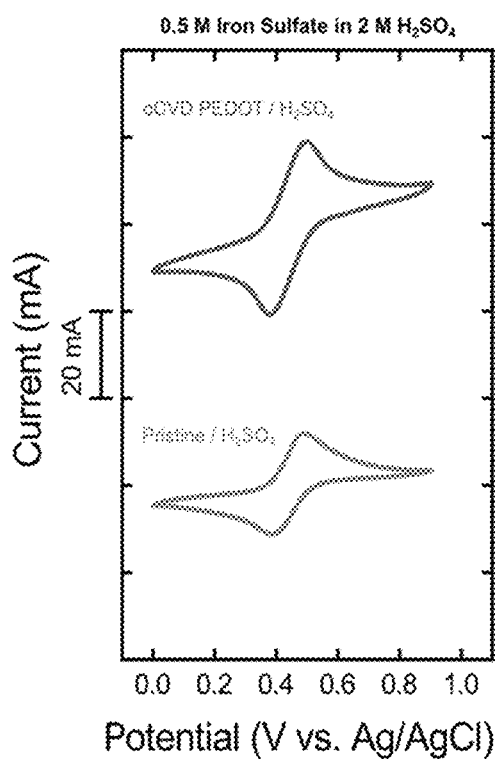

A photograph of oCVD PEDOT coated carbon fibers that were directly integrated into the RFB is shown in FIG. 3A. Cyclic voltammograms (CVs) were conducted in aqueous acidic electrolytes containing iron salts to qualitatively assess oCVD PEDOT coated electrode activity (FIG. 3B & 3C). In all experiments, the working electrode consisted of either untreated AvCarb 1071 (pristine) or oCVD PEDOT-coated AvCarb 1071. The solution compositions in cyclic voltammetry and flow cell testing consisted of total active species concentration of 0.5 M with 50% state of charge (SoC) for electroactive compounds, while the concentration of the supporting electrolyte was 2 M. To examine the impact of supporting salt counter-anion on oCVD PEDOT-coated electrodes, electrolytes with either hydrochloric acid (HCl) or sulfuric acid ($H_2SO_4$) were employed. Redox peaks were evident in all CVs for coated electrodes in iron-based solutions, indicating that coated electrodes are electrochemically active in iron solution regardless of the counter-anion. The redox potential for the CVs (FIG. 3B & 3C) were consistently ca 0.435 V vs Ag/AgCl, consistent with prior art.

Figure 4A:
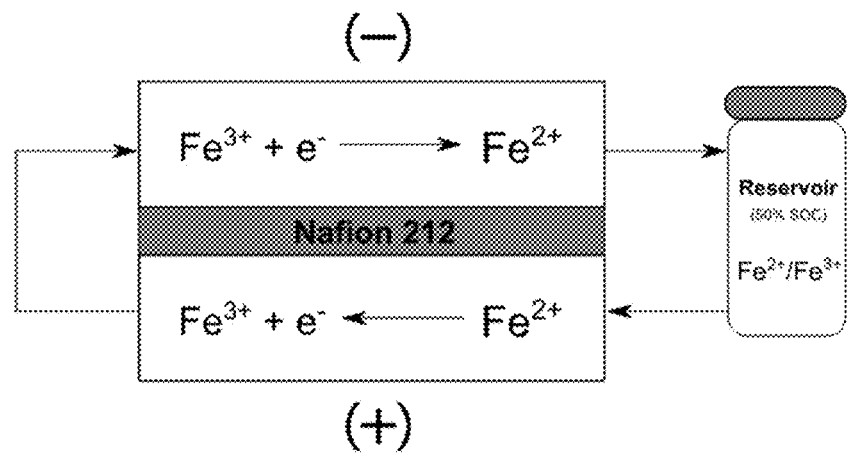
FIGS. 4A-4E shows that PEDOT-coated electrodes improve performance in iron-based electrolytes.

Based on the results from the CVs, the performance of PEDOT-coated electrodes was evaluated in iron-based solutions using a single-electrolyte flow cell configuration, quantifying resistive losses via electrochemical impedance spectroscopy (EIS) and cell polarization at steady-state conditions and 50% state-of-charge (SoC, schematic shown in FIG. 4A). In this setup, electrolyte is first oxidized at the positive electrode and then reduced at the negative electrode before re-circulation into the reservoir. The single-electrolyte flow cell configuration enables identification of individual contributions from ohmic, kinetic, and mass transport resistances in operation, without introducing additional extraneous variables that obfuscate the direct effect of the coating on electrode cell performance. The relative contribution of ohmic, kinetic, and mass transport resistances can be isolated by fitting an equivalent Randles-like circuit with bounded Warburg diffusion to Nyquist plots obtained using EIS. In this circuit, $R_\Omega$ corresponds to ohmics, $R_{CT}$ to charge-transfer resistance, and $R_{MT}$ extracted from bounded Warburg diffusion ($W_\delta$) relates to mass-transfer resistance.

Figure 4B:
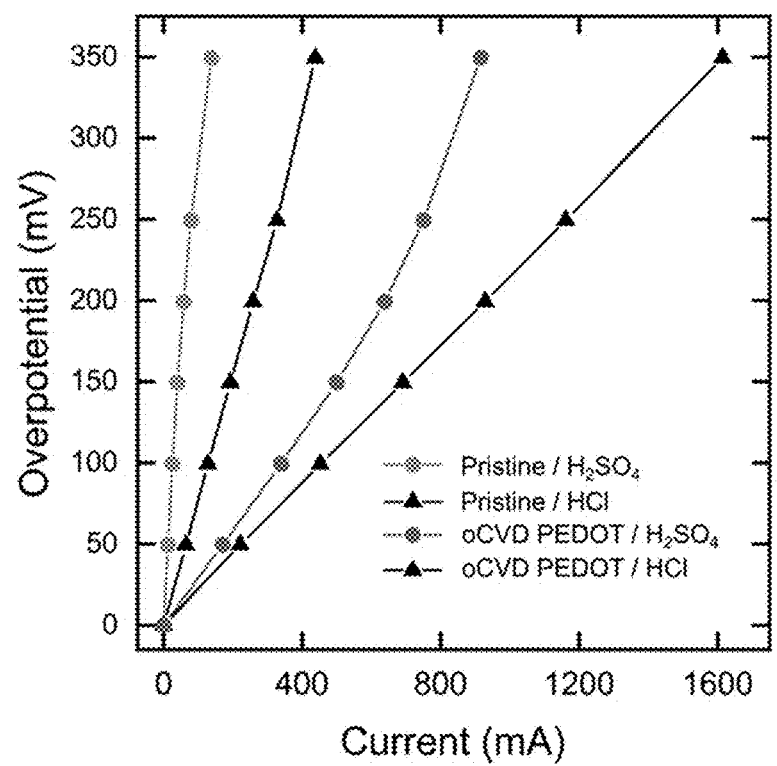
Figure 10:
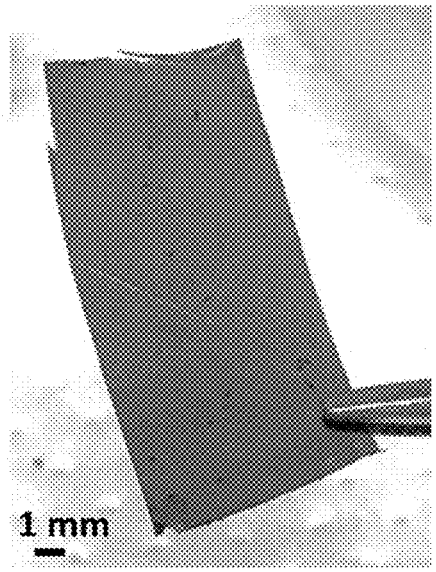
FIG. 10 is a photograph of oCVD PEDOT coated graphene. To overcome the shadowing effects of carbon fibers in XPS analysis, the oCVD PEDOT film with the thickness of approximately 200 nm was deposited in the graphene with the ten monolayers. The prepared sample was exposed to iron chloride electrolyte and was completely rinsed with methanol before performing the XPS measurement.
Figure 11:
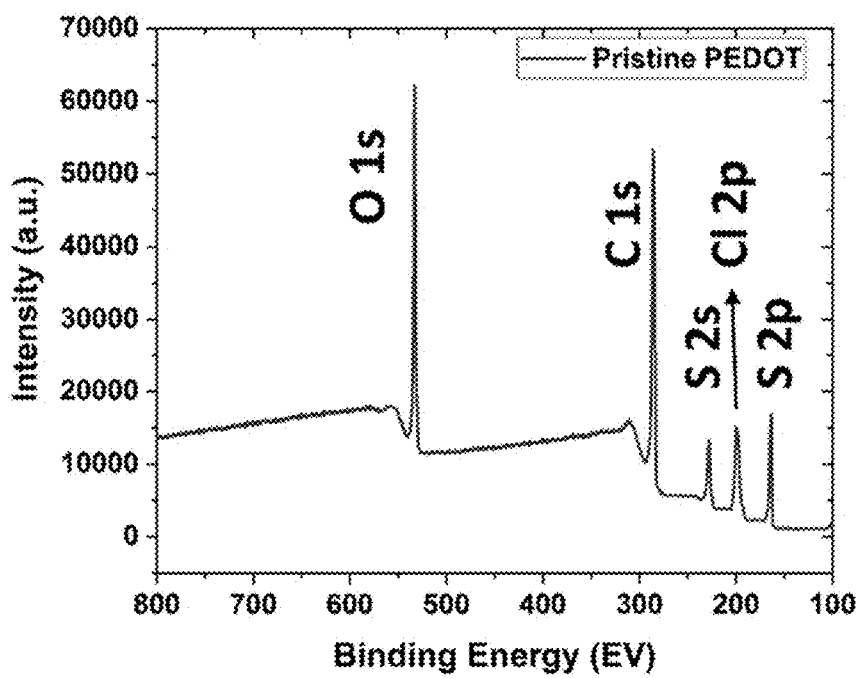
FIG. 11 shows the XPS analysis of oCVD PEDOT film. The XPS spectra of pristine oCVD PEDOT grown on graphene and observed peaks of PEDOT components.
Figure 12A:
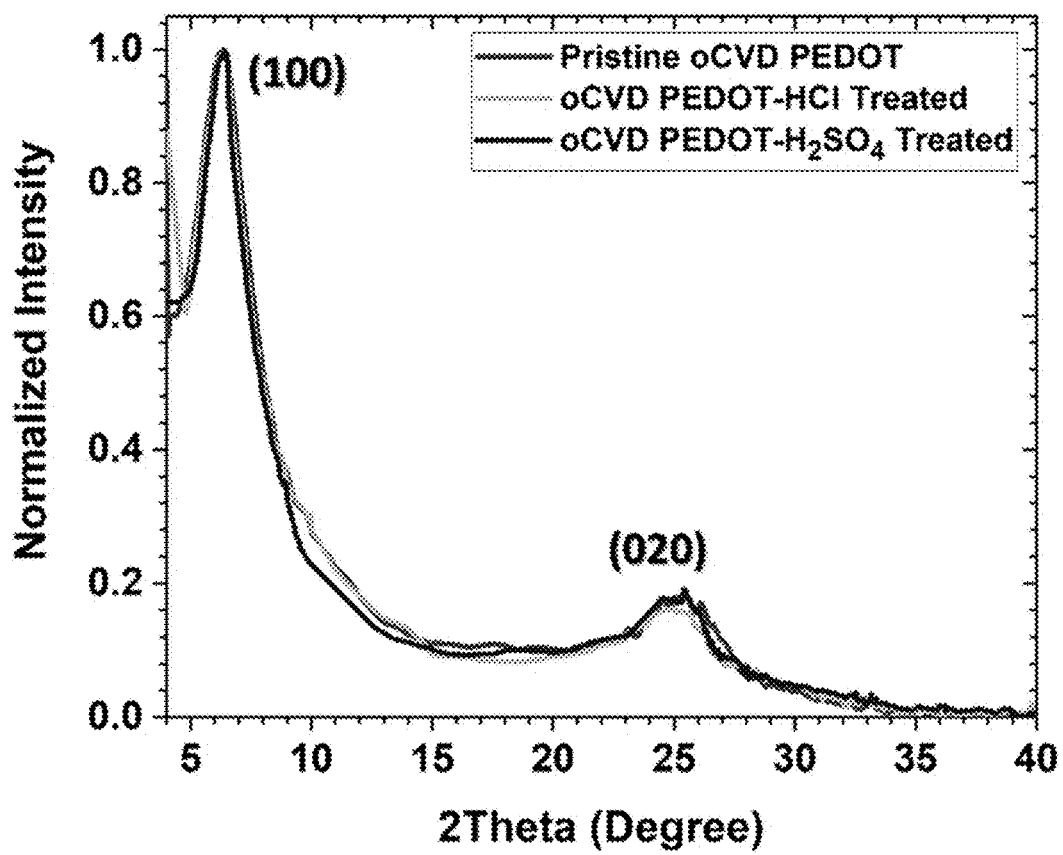
FIGS. 12A-12C show the GIXRD analysis of oCVD PEDOT films exposed to HCl and $H_2SO_4$. The PEDOT thin films exposed to HCl and $H_2SO_4$ exhibit enhanced crystallinity characteristics, specifically increased crystallite size. The crystallite size was extracted using the Scherrer equation (D=s $\lambda/((\beta-\beta_{inst})\cos\theta)$, where D is the crystallite size, s is the dimensionless shape factor (taken as 0.9), $\lambda$ is the wavelength of the incident X-ray beam, $\beta-\beta_{inst}$ is the FWHM of a diffraction peak after subtracting the instrumental broadening, and $\theta$ is the angle of incident). The obtained crystallite size in the a-axis direction of pristine oCVD PEDOT and oCVD PEDOT exposed to HCl and $H_2SO_4$ are 5.7, 6.0, and 7.6 nm, respectively. There was no notable change in crystallite size in the b-axis direction, and extracted values were 3.2, 3.4, and 3.3 nm for pristine PEDOT, PEDOT exposed to HCl, and PEDOT exposed to $H_2SO_4$, respectively.
Figure 12B:
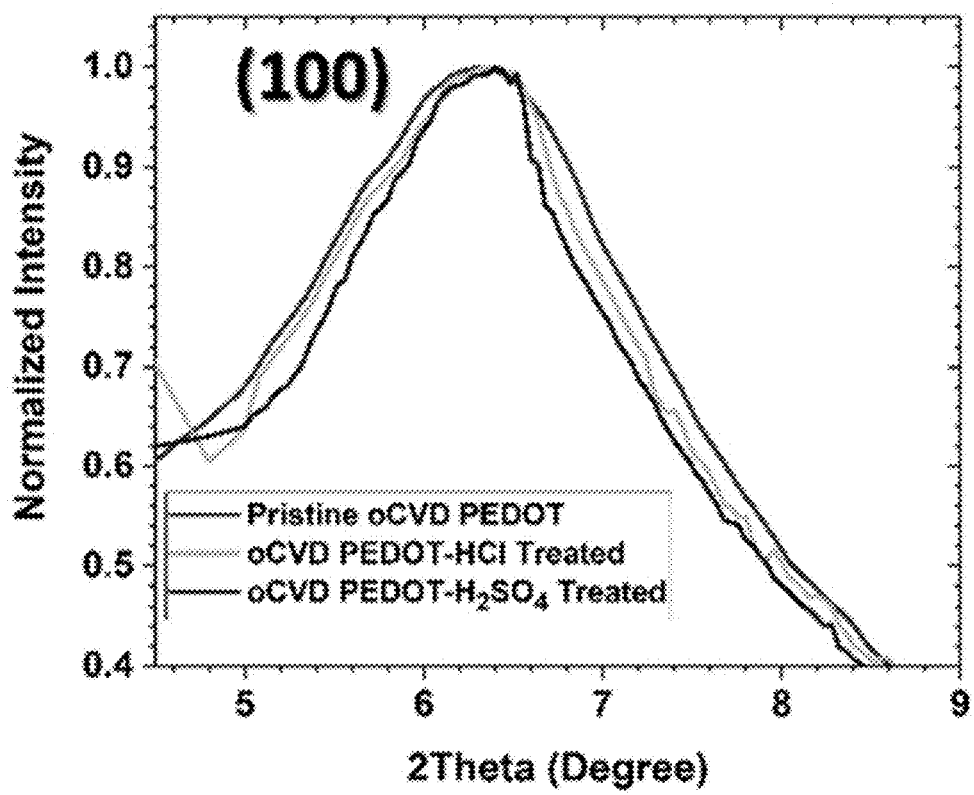
Figure 12C:
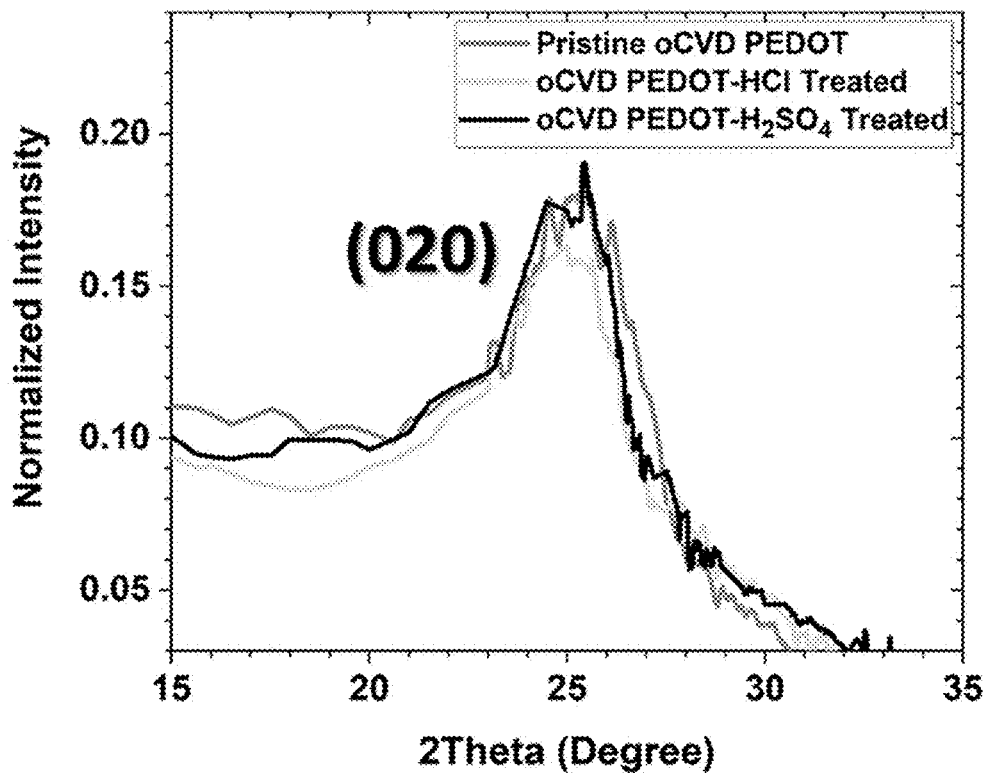

FIG. 4B shows a comparison of cell polarization for pristine and PEDOT coated electrodes with the best performance ($T_g$=80° C., 78 nm thickness) in iron chloride and iron sulfate electrolytes with an active species concentration of 0.5 M Fe(II)/Fe(III). In both electrolytes, coated electrodes demonstrate higher currents at similar applied overpotentials than uncoated electrodes, indicating lower resistance and higher power capabilities. The best-performing combination is the PEDOT-coated electrode in iron chloride, in part due to larger kinetic and mass transport resistances for iron sulfate compared to iron chloride. However, at an applied overpotential of 350 mV, the relative increase in current for PEDOT-coated electrodes as compared to uncoated electrodes is greater in iron sulfate (~6.7×) than in iron chloride (~3.7×). The greater multiplicative enhancement of obtained current may be attributed to the improvement in crystallinity characteristics of PEDOT in $H_2SO_4$, primarily an increase in the crystallite size. The obtained crystallite size in the a-axis direction (edge-on orientation) of pristine PEDOT and PEDOT treated with HCl and $H_2SO_4$ are 5.7, 6.0, and 7.6 nm, respectively (FIG. 10). The crystallinity enhancement of PEDOT is hypothesized to improve the kinetics of electron transfer rate by enabling better energetic overlapping the density of state (DOS) between PEDOT and redox-active species as predicted by the Marcus-Gerischer model. The enhancement of electrochemical performance by improved crystallinity is also reported in poly(3-hexylthiophene) (P$_3$HT) due to the better DOS overlapping of the electrode and redox-active species.

Figure 4C:
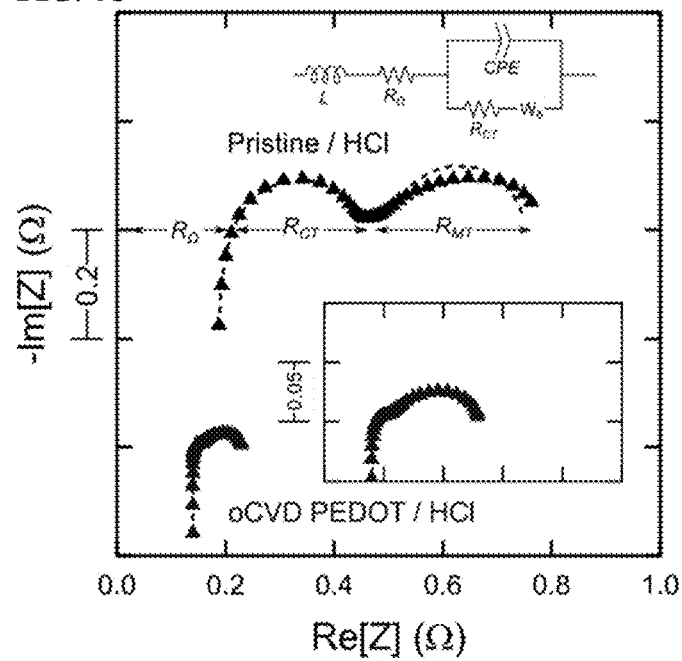
Figure 4D:
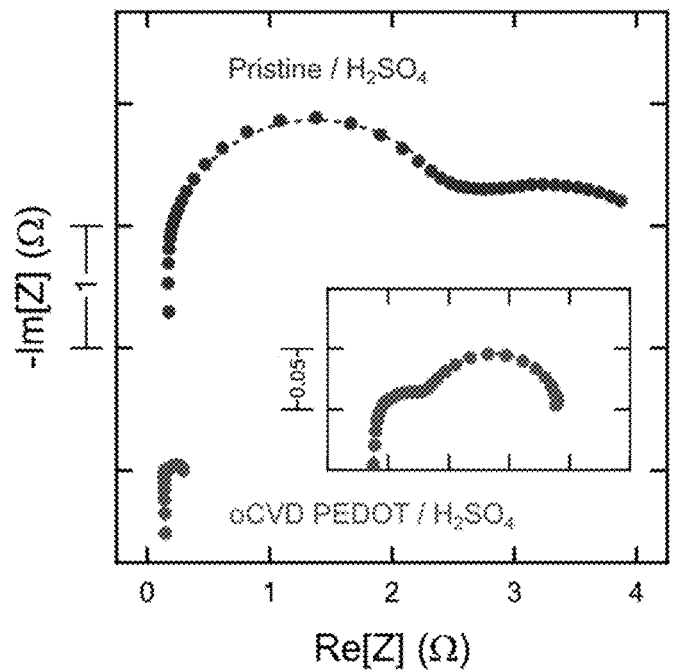

Encouragingly, we observe from fitted EIS data that the PEDOT coating reduces all forms of overpotential (FIG. 4C & 4D) indicating that the conducting polymer film imparts multiple benefits. The reduction in ohmics was attributed to result from better contact between current collector/electrode/membrane components due to polymeric interlayers. Indeed, improved surface area from better wetting may partially explain kinetic enhancement.

Figure 13A:
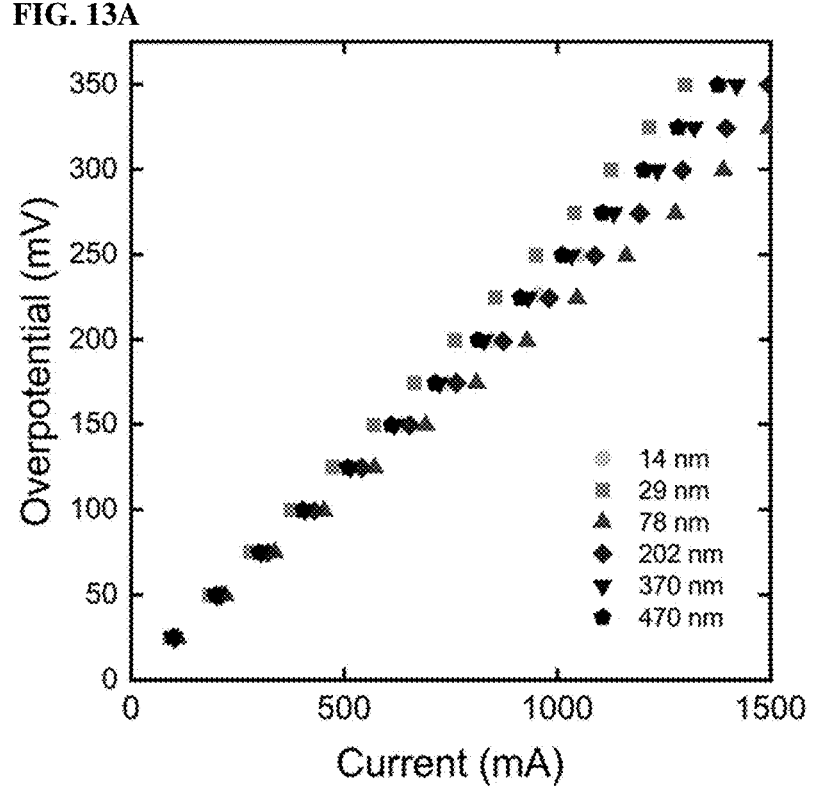
FIGS. 13A & 13B show the Polarization and EIS for different oCVD PEDOT-coating thicknesses.
Figure 13B:
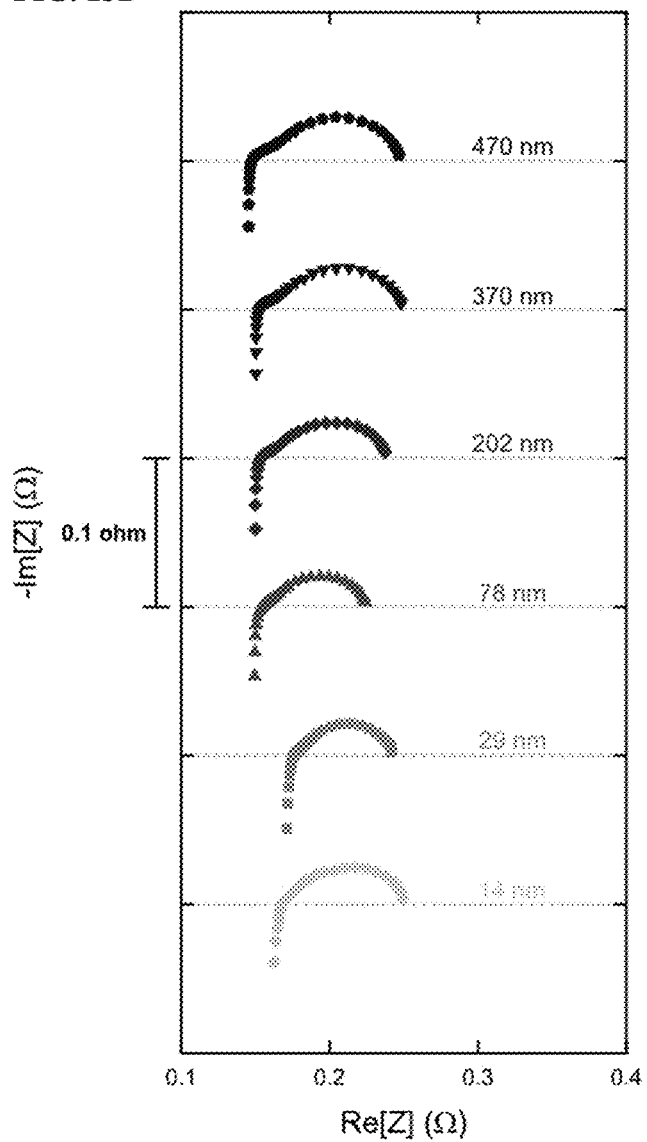
Figure 14A:
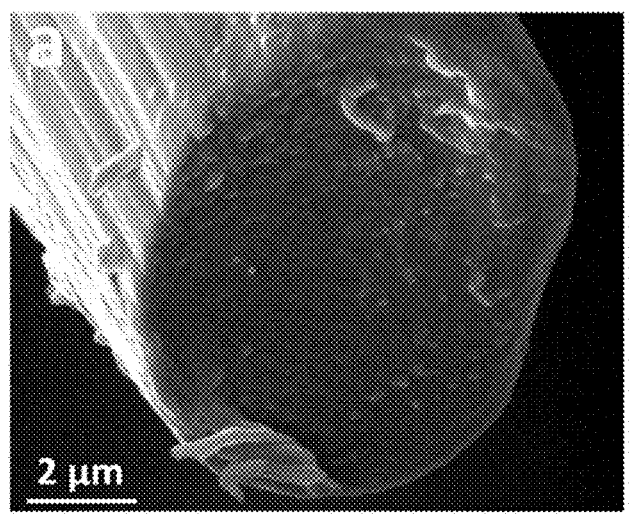
FIGS. 14A-14D show cross-sectional SEM and EDS mapping of oCVD PEDOT coated carbon fiber after exposing to the electrolyte.
Figure 14B:
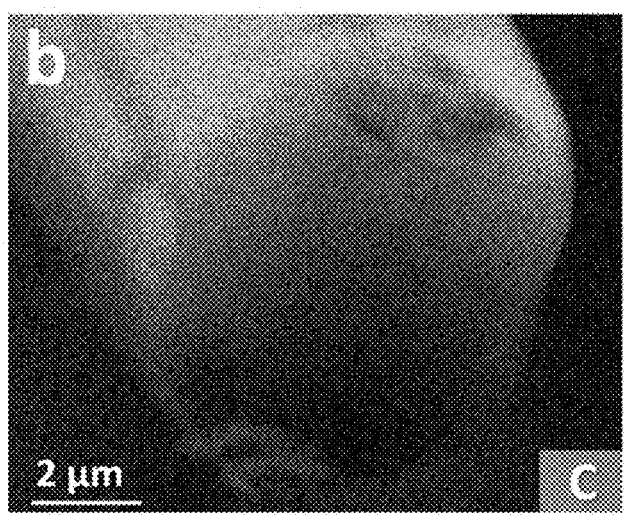
Figure 14C:
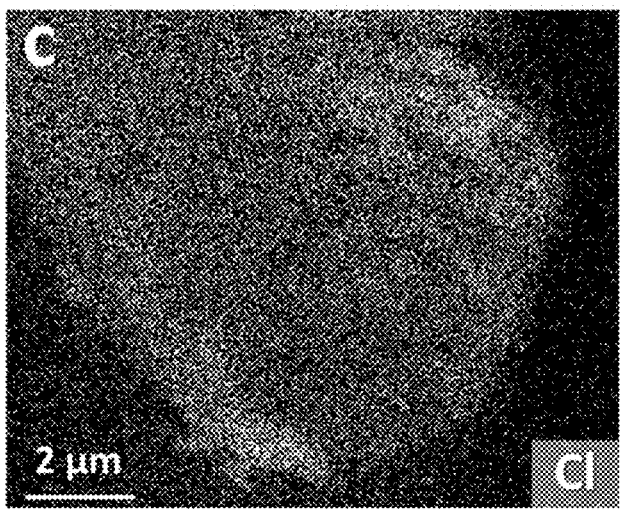
Figure 14D:
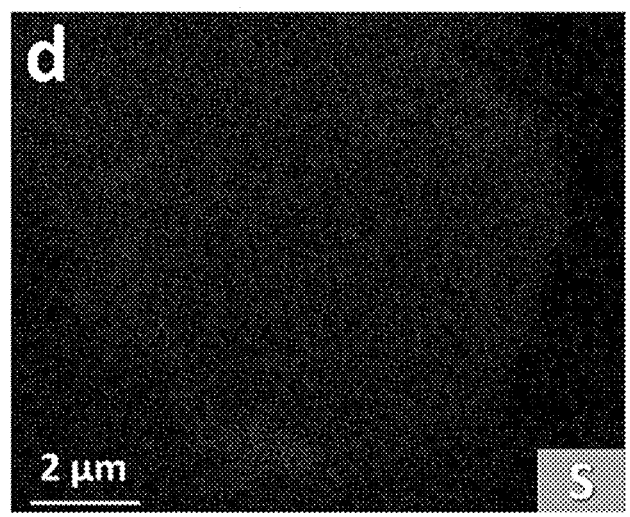

Of special pertinence, however, is the role of mass transport through the PEDOT film. While ohmic and kinetics are more difficult to tune, an understanding of ion transport through the nanolayer affords the possibility of using factors such as flow rate and electrolyte concentration to reducing mass transfer resistance in convection-enhanced cells. To this end, the performance of six electrodes at thicknesses of 14, 29, 78, 202, 370, and 470 nm was evaluated in the single-electrolyte flow cell in iron chloride (FIG. 13). In the experimental setup, the highest currents were observed with a thickness of 78 nm, although shifts in performance across the film thicknesses were marginal relative to improvements over the pristine electrode. It was noted that the optimal coating thickness for highest power output will depend on system level factors such as operating flow rate, reactor configuration, and flow channel; furthermore, the optimal thickness is dependent on the desired electrochemical application and film material properties. The best-performing 78 nm thick semi-crystalline PEDOT film, grown at the deposition temperature of 80° C., contains both edge-on (ca. 8.1%) and face-on (ca. 91.9%) orientations (Table S2). It is postulated that the presence of edge-on orientation, with sufficient electrical conductivity, is favorable for electrochemical applications and for facilitating ion transport. Thus, the better electrochemical performance of 78 nm thick semi-crystalline PEDOT film grown at 80° C. can be attributed to the higher preferential edge-on orientation in that sample compared to its counterparts grown at 140° C. as well as those samples grown at 80° C. with the lower thickness. In addition to the preferential orientation, the thickness limit is another important parameter that needs to be considered. As mentioned earlier, conductive polymers are ionically permeable, and the upper thickness limit needs to be considered for enhanced ionic permeability characteristics of conducting polymers such as PEDOT. Xu et al. also reported the presence of a thickness limit in PEDOT thin films for electrochemical applications. Specifically, it was reported that an optimal oCVD PEDOT film thickness of 20 nm to obtain the best performance in layered lithium transition metal oxide cathodes such as LiNi$_{1/3}$Co$_{1/3}$Mn$_{1/3}$O$_2$ (NCM111).

Figure 4E:
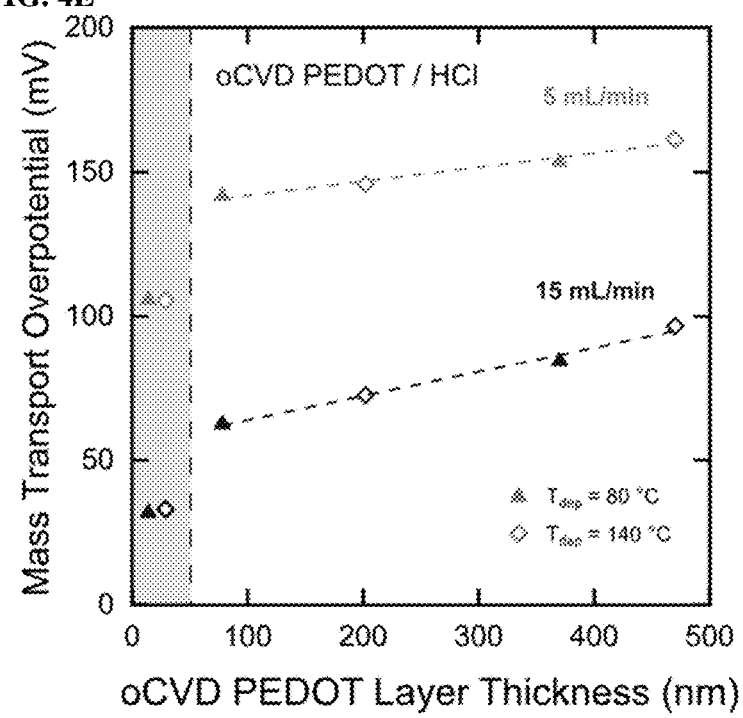

Magnitudes of mass transport overpotential at flow rates of 5 mL min$^{-1}$ and 15 mL min$^{-1}$ are detailed in FIG. 4E. Mass transport overpotential as a function of thickness is discontinuous at ~50 nm, which we tentatively ascribe to a transition from lower to higher-dimensional transport regimes. Above 50 nm thickness, mass transport increases linearly, suggesting thicker PEDOT layers increase resistance to active species diffusion to a buried reactive carbon/PEDOT interface. Mass transport is also convection dependent, as the higher flow rate exhibits the same trend as the lower flow rate, but with lower overpotential. Therefore, both convection and thickness affect mass transport, operating simultaneously during flow cell operation. FIG. 4E suggests that partitioning of reactive iron species between the electrolyte and PEDOT film occurs, in which Fe$^{2+/3+}$ becomes entrapped in the PEDOT film, reducing the effective boundary layer required for the redox actives to diffuse to the reactive carbon interface. In this scenario, it was hypothesized that convection influences total mass transport by homogenizing the concentration of the bulk electrolyte, forming a boundary layer as actives diffuse from the bulk electrolyte to the PEDOT film, thus influencing the partitioning and concentration of iron actives at the electrolyte/PEDOT surface.

Figure 5A:
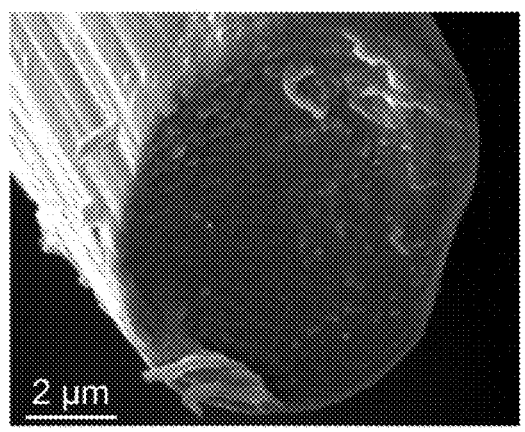
FIGS. 5A-5I Mass-transport limitation through PEDOT film.
Figure 5B:
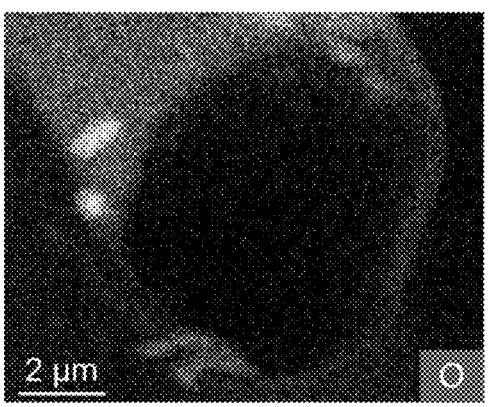
Figure 5C:
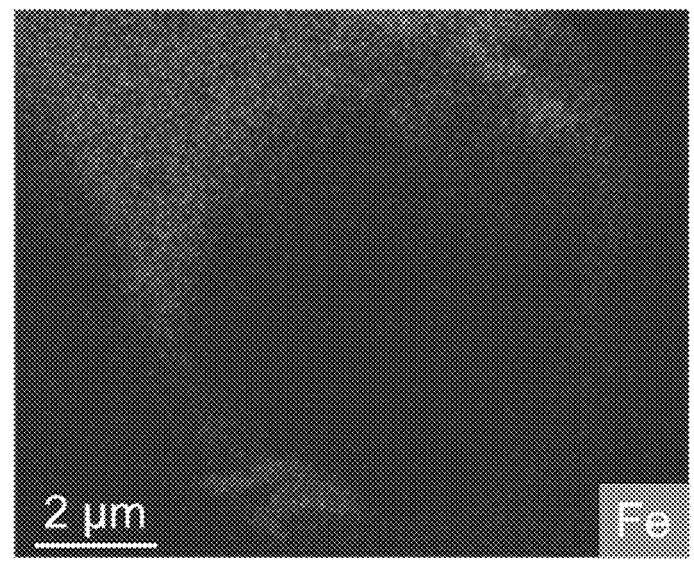
Figure 5D:
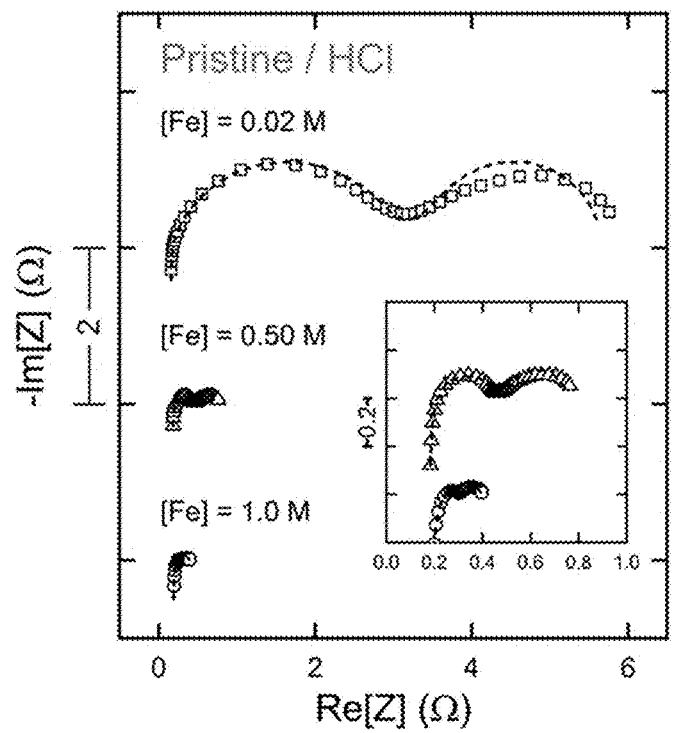
Figure 5E:
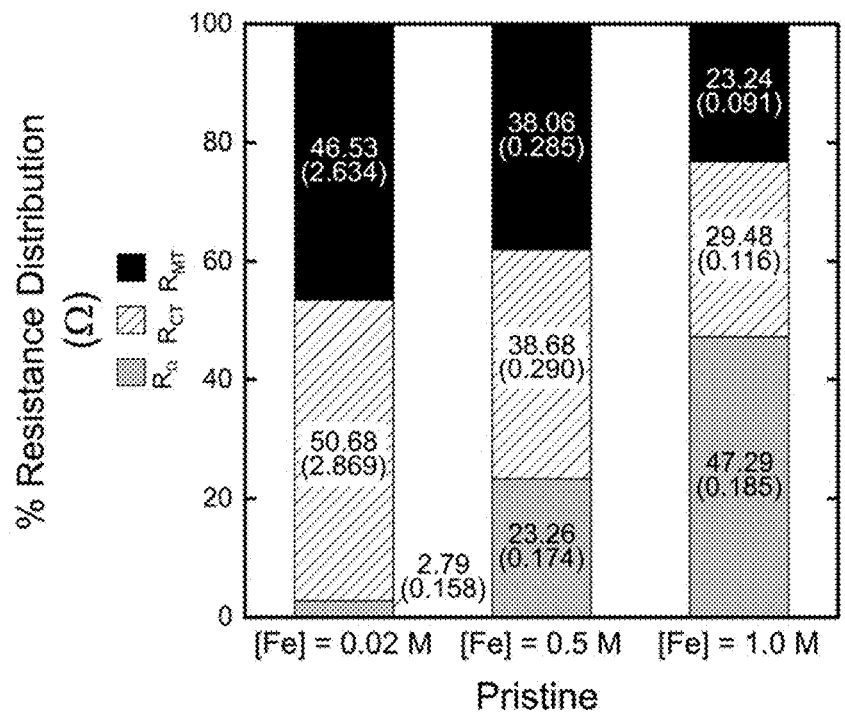
Figure 5F:
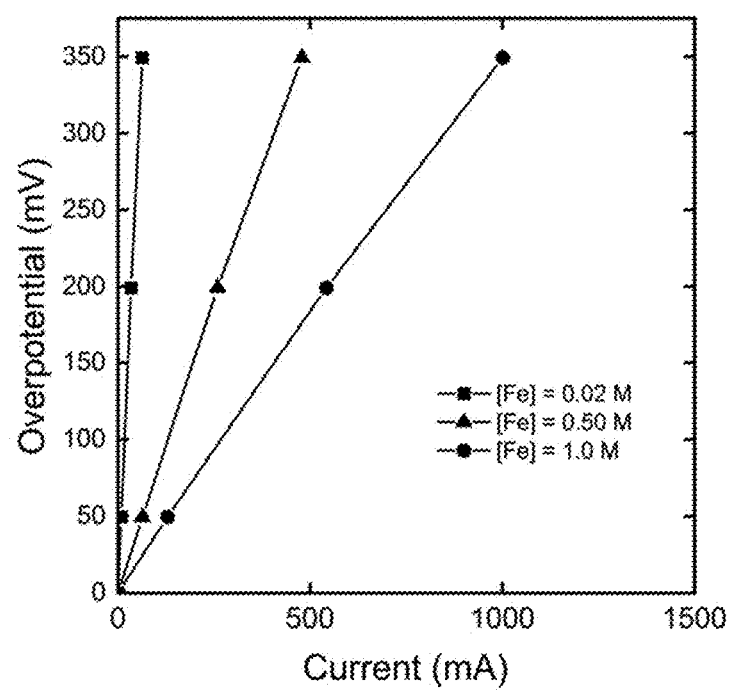
Figure 5G:
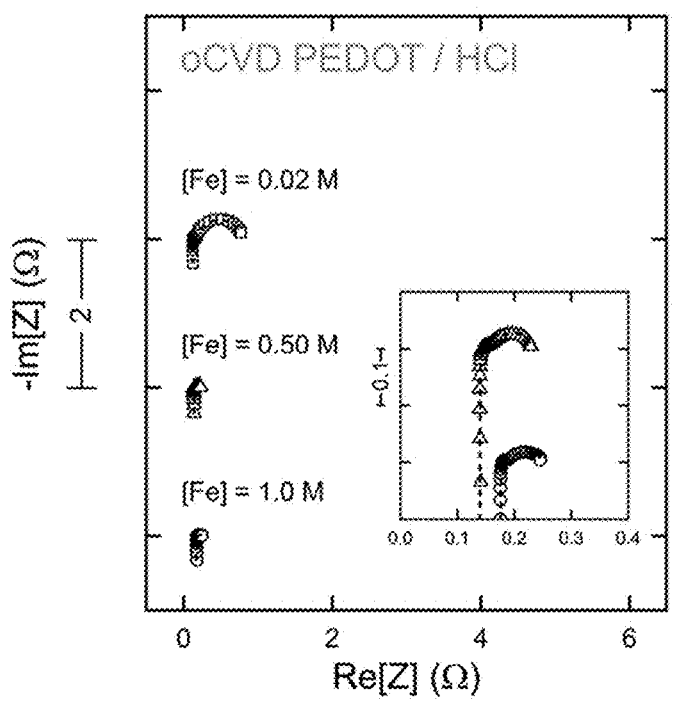
Figure 5H:
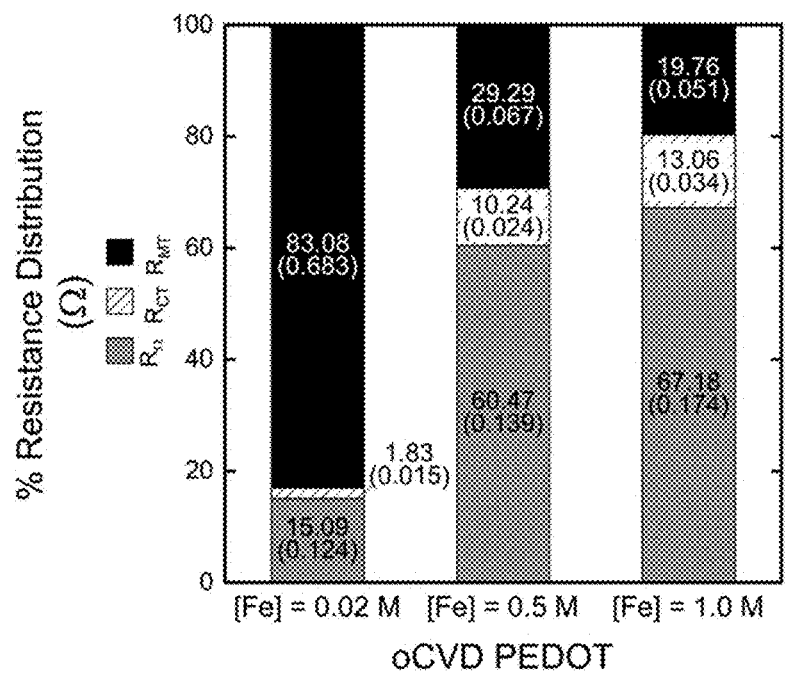
Figure 5I:
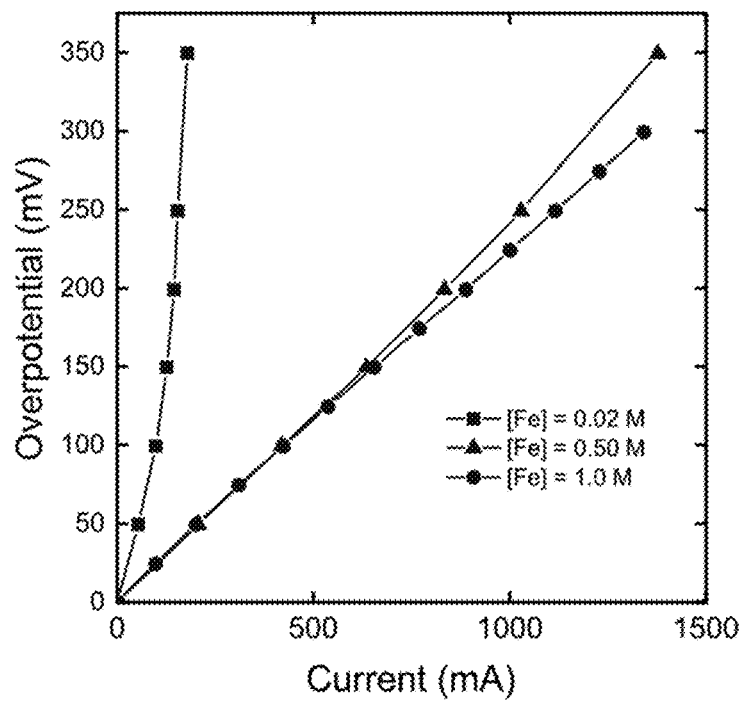
Figure 6A:
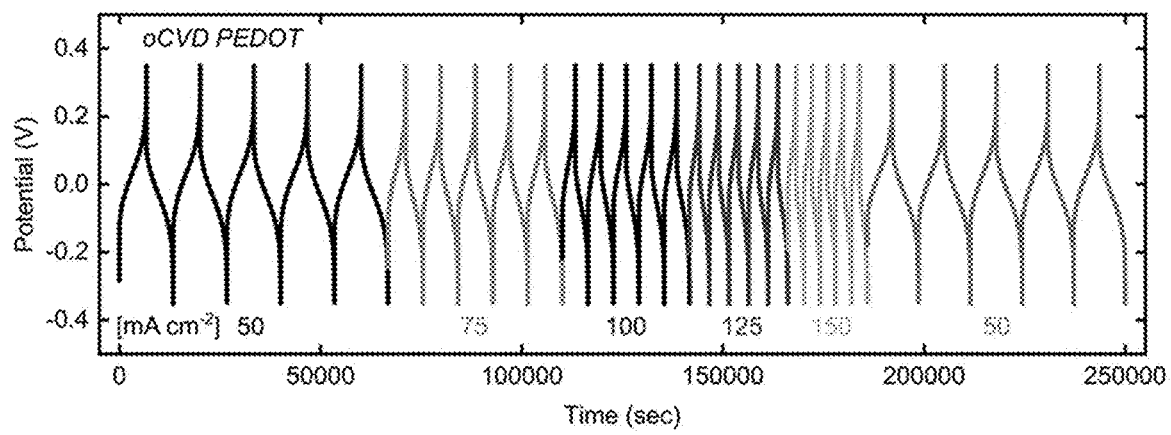
FIGS. 6A-6D show that PEDOT films remain stable and are durable after cycling for several days.
Figure 6B:
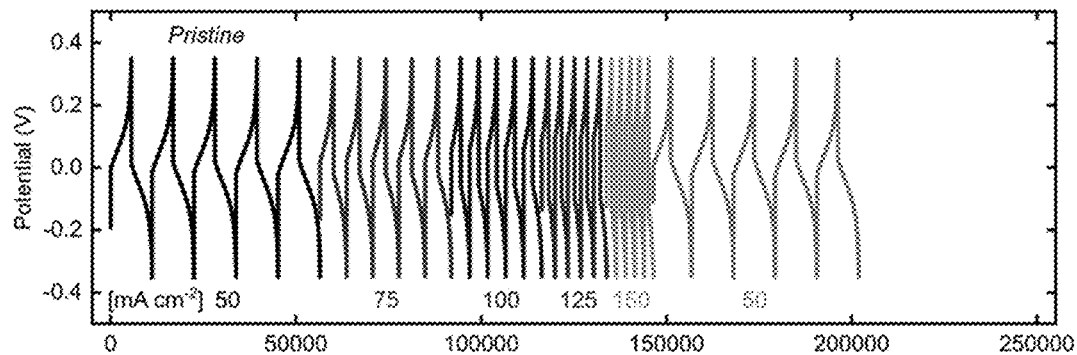
Figure 6C:
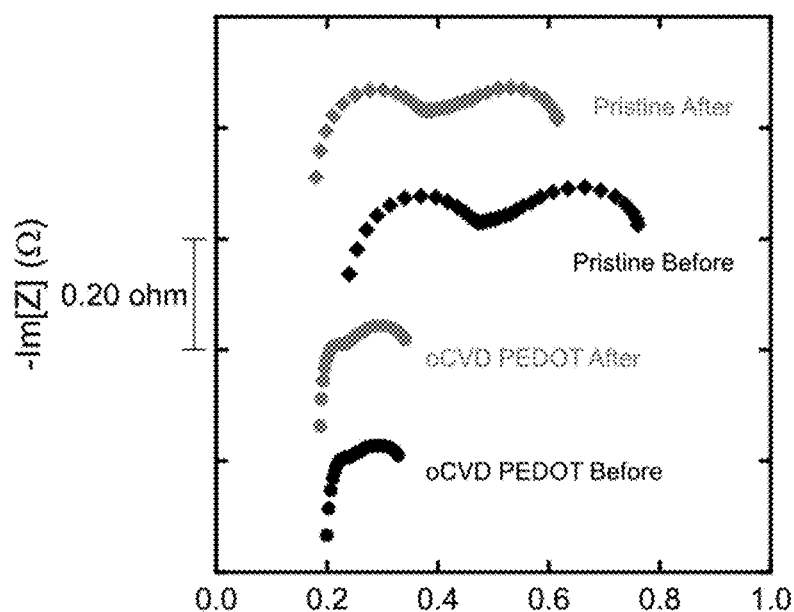
Figure 6D:
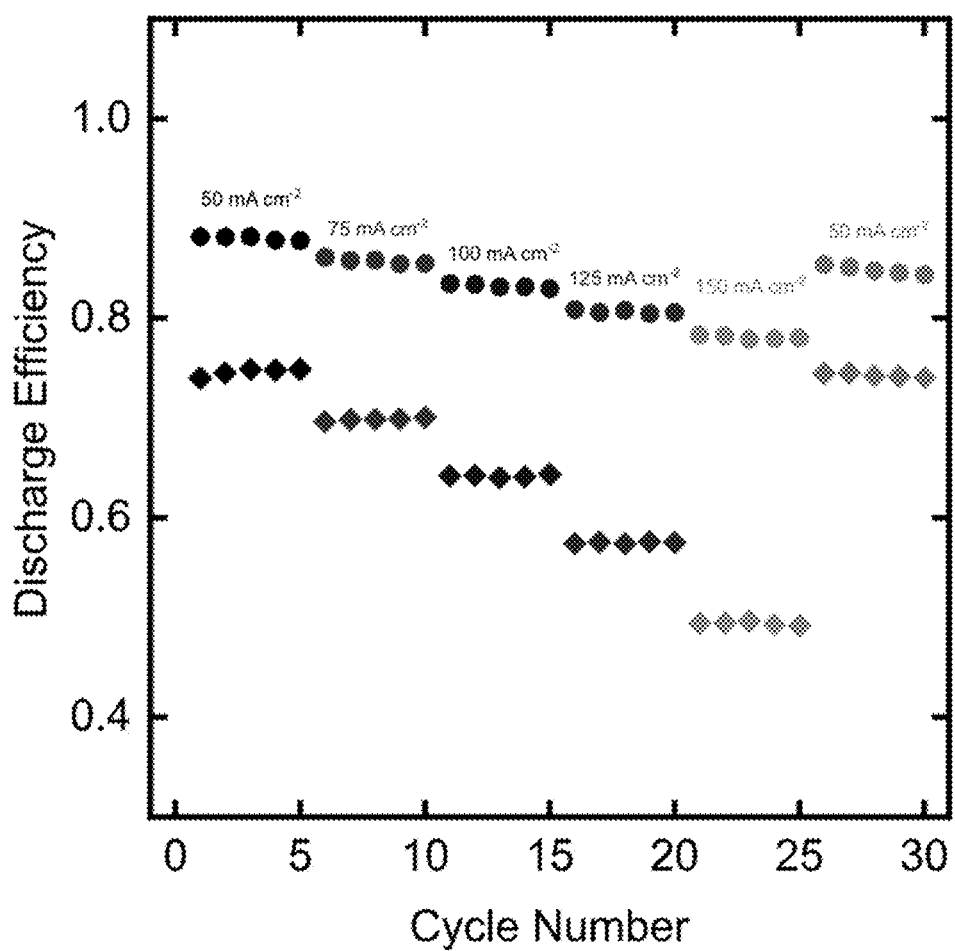

Insights into the structure of coated carbon fiber exposed to the iron-based electrolyte reveals that the durable and stable nature of the conformal oCVD PEDOT film is maintained after electrochemical tests within the flow cell (FIG. 5A). There was no observed delamination and the integrity of the oCVD PEDOT film is also maintained after electrochemical reactions and can be directly observed from the electrode cross-section energy dispersive spectroscopy (EDS) mapping of the oxygen element (FIG. 5B) and other elemental components of PEDOT (FIG. 14). The trace of iron can be noted in the elemental EDS mapping (FIG. 5C), which is consistent with obtained XPS results (FIG. 2D), and further support the hypotheses on the penetration of iron cations into the nanometric film. To further examine mass transport behavior through the film, polarization and EIS for the relatively thicker 202 nm PEDOT-coated electrode was evaluated across a range of iron chloride electrolyte concentrations (0.02, 0.5, and 1.0 M Fe$^{2+}$/Fe$^{3+}$) and compared to the uncoated electrode, shown in FIG. 5. For uncoated electrodes, the resistance distribution (FIG. 5E) based on equivalent circuit fits to Nyquist plots (FIG. 5D) shows a consistent reduction in kinetic and mass transport resistance with increasing concentration, in agreement with prior art. Interestingly, in PEDOT-coated electrodes, mass transport resistance reduces significantly from 0.02 M to 0.5 M, but experiences diminishing returns from 0.5 M to 1.0 M, despite similar ohmic and kinetic resistances at all concentrations (FIGS. 5H & 5G). Cell polarization of coated electrodes (FIG. 5I) shows marked performance improvement between 0.02 and 0.5 M concentrations, while 0.5 and 1.0 M are nearly identical. This observation appears to indicate that, in this concentration range, the overall mass transfer coefficient is independent of iron concentration in the flowing electrolyte as the iron concentration partitioned into the PEDOT film is at saturation. Surprisingly, despite the PEDOT film acting as a second resistance to mass transport, overall redox rate increases. It is hypothesized that preferential segregation of iron into the PEDOT as observed by XPS after film exposure to the electrolyte still reduces effective iron concentration gradients at the electrode surface, thus lowering overall mass transport resistance. To conclude the discussion on transport, the results suggest that two modes of mass transport resistance act for the coated electrodes: (1) diffusion from the bulk electrolyte to the PEDOT surface, which is not significantly affected by the presence of the coating, and (2) assisted diffusion unique to the oCVD PEDOT coatings whereby iron active species partitioning into the nanometric film improve overall mass transfer. This phenomenon will be explored in detail in a subsequent publication.

To investigate the longevity of the PEDOT coating, a symmetric cell galvanostatic cycling experiment was performed in iron chloride electrolyte over the course of ~2.9 days (FIG. 6). The cells were cycled for five times at current densities of 50, 75, 100, 125, 150, and again at 50 mA cm$^{-2}$ to assess changes in performance after higher current density cycling. FIGS. 6A & 6B reveal that PEDOT-coated electrodes cycle longer than pristine electrodes due to fewer overpotential losses. Nyquist plots before and after cycling are similar in appearance and overall resistance, demonstrating that the PEDOT-coated electrode are stable (FIG. 6C) without any delamination issue as shown in FIG. 5A-5C and FIG. 14. Furthermore, the discharge capacity exceeds 80% even after several days of cycling, exceeding that of the pristine (FIG. 6D). Therefore, the benefits from using PEDOT-coatings on electrodes are electrochemically and mechanically durable over longer durations are readily apparent.

In summary, ultraconformal semi-crystalline oCVD PEDOT coated carbon fiber electrodes are promising for RFBs is demonstrated. PEDOT-coated electrodes enhanced maximum current density by ~6.7× in iron sulfate, and ~3.7× in iron-chloride, due to a reduction in ohmic, kinetic, and mass transport overpotentials. To examine the transport of iron through the PEDOT film, tested PEDOT films of varying thickness, were tested under conditions with different electrolyte flow rates and concentrations, finding that mass transport overpotential varies as a function of thickness and convection. The dependence on both factors suggests mass transport limitation has two components in series, the first consisting of transport through the boundary layer of the electrolyte and the second consisting of transport through the oCVD PEDOT layer. An optimal oCVD PEDOT thickness of 78 nm at a 15 mL min$^{-1}$ flow rate was identified. The demonstration of oCVD PEDOT coated electrodes enhancing performance presents future opportunities for the advanced surface engineering of porous materials in RFBs to mediate desired electrochemistry.

Materials Characterization Methods

The in-plane electrical conductivity was obtained with a standard four-point probe method using the Jandal four-point probe (CYL-1.0-100-TC-100-RM3) connected to Keithley 2000 and 2400 multimeters. The film thickness of PEDOT grown on a silicon wafer as a reference is obtained using a step-height profilometer (Veeco Dektak 150). The thickness of conformal PEDOT coating around each carbon fiber confirms with the Zeiss Merlin high-resolution Scanning Electron Microscope (SEM). The Grazing Incidence X-ray diffraction (GIXRD) analyses were carried out using a Rigaku Smart lab diffractometer operated at 45 kV and 200 mA with Cu-K$_\alpha$ radiation of λ=0.15418 nm. The X-ray photoelectron spectroscopy (XPS) measurements were conducted using a Surface Science Instruments SSX-100 (Scienta Omicron ESCA-2SR). The sample was exposed to iron chloride solution overnight, followed by thoroughly rinsed with methanol before examination to ensure detected iron was from within the PEDOT layer and not due to residual electrolyte contamination. The XPS analysis was performed, while operating pressure of ~2×10-9 Torr was applied and the monochromatic Al-K$_\alpha$ radiation with the photon energy of 1486.70 eV was used. The CasaXPS software was used to evaluate the atomic percentage (at. %) of elements. The surface topography of the thin film was analyzed using atomic force microscopy (AFM), while using a tapping mode with a Veeco Dimension 3100 AFM. The Raman spectroscopy characterizations of samples were carried out by a Horiba Jobin-Yvon HR800 with a laser wavelength of 785 nm. Attenuated total reflection-Fourier transform infrared (ATR-FTIR) analyses were carried out using a NICOLET iS50 FT-IR with ATR attachment.

Electrolyte Preparation

For all solution compositions in flow cell testing, cyclic voltammetry, and XPS analysis, the total concentration of all active species were 0.5 M with 50% state of charge (SoC) for electroactive compounds, while the concentration of the supporting electrolyte was 2 M. To prepare the iron-based electrolytes with the hydrochloric acid as the supporting electrolyte, iron(II) chloride tetrahydrate (FeCl$_2$.4H$_2$O, 98%, Sigma Aldrich), iron(III) chloride hexahydrate (FeCl$_3$.6H$_2$O, 97%, Sigma Aldrich), and hydrochloric acid (HCl, 37%, Sigma Aldrich) were dissolved in DI water at room temperature. For preparing the Fe/H$_2$SO$_4$ solutions, iron(II) sulfate heptahydrate (FeSO$_4$.7H$_2$O, 99%, Sigma Aldrich), iron(III) sulfate pentahydrate (Fe$_2$(SO$_4$)$_3$.5H$_2$O, 97%, ACROS Organics™), sulfuric acid (H$_2$SO$_4$, 95%, Sigma Aldrich) along with DI water were used. All the chemicals were used as-received without any further modification.

Flow Cell Experiments

Schematic of the flow battery used for conducting flow cell experiments has been shown in FIG. 3. As illustrated in FIG. 3, all the flow cell experiments were performed using a single electrolyte configuration to maintain a constant SoC throughout the experiments. The RFB architecture included interdigitated flow fields machined on impregnated graphite (G347B graphite, MWI Inc.), polypropylene flow diffusers (Adaptive Engineering), and Nation® 212 membrane sandwiched between the positive and negative electrodes. Polytetrafluoroethylene (PTFE) gaskets were used in the negative and positive sides for sealing the electrolyte and providing the required compression. A single layer electrode, as-received AvCarb 1071 cloth, with a projected area of 2.55 cm$^2$ (1.7 cm×1.5 cm) was utilized for the negative and positive sides to provide the baseline performance data. The oCVD PEDOT-coated electrodes with various configurations were assembled and tested within the flow cell using a similar protocol.

To conduct the polarization analysis, the electrolyte was pumped using a Masterflex peristaltic pump (Cole Parmer, USA) through Masterflex Norprene tubing (Cole Parmer, USA). A rigorous procedure was utilized for calibrating the flow rate; upon calibration, various flow rates (i.e. 5 and 15 mL min$^{-1}$) were used for circulating the electrolyte through the flow cell. To store the electrolytes, a glass cell reservoir was used, and humidified nitrogen gas was constantly purged through the reservoir. A Bio-Logic VMP-3 potentiostat along with multichannel Arbin potentiostat/galvanostat was employed for conducting the polarization experiments as well as the electrochemical impedance spectroscopy (EIS). The polarization measurements were conducted by applying overpotential from 0 to 350 mV (interval of 50 mV) holding the potential constant for 5 min at each step and recording the corresponding current (last 40% of the recorded data arithmetically averaged). The AC impedance experiments were performed at open circuit voltage with a 5-mV perturbation amplitude within the frequency range of 0.2 MHz-10 mHz. For the symmetric cell experiments, a flow rate of 15 mL min$^{-1}$ was used. The starting electrolyte was 0.5 M iron chloride at 50% SoC in a 2 M HCl supporting electrolyte. A volume of 20 mL was used in each reservoir, leading to a maximum theoretical capacity of ca. 268 mAh during full cycling.

Cyclic Voltammetry Measurements

A Bio-Logic VMP-3 potentiostat was utilized for conducting the cyclic voltammetry (CV). A 3-electrode setup was used for performing the CV tests. The cell was constantly purged with the nitrogen gas throughout the entire experiment. A platinum mesh was served as the counter electrode and an Ag/AgCl fritted electrode (Filling solution: 1M KCl, CH Instruments) was employed as the reference electrode. The CV scan rate was 5 mV s$^{-1}$ and were not IR-corrected due to the complex geometry of porous carbon electrodes that belies drawing definite conclusions from potentiodynamic measurements.

Table S1. Deposition Process Parameters and Vapor Saturation Ratio of Reactants used in the Growth of oCVD PEDOT Films.

Experimental details relate to the flow rate of EDOT and VOCl$_3$, reactor pressure film thickness and deposition rates. The saturation pressure of reactants at the temperature of interest were obtained using the Clausius-Clapeyron equation. Normally, the deposition rate increases with the decrease in deposition temperature.

TABLE S2

The percentage of preferential orientation as a function of growth temperature and oCVD PEDOT film thickness.

| Deposition Temperature (° C.) | EDOT Flow Rate (sccm) | VOCl$_3$ Flow Rate (sccm) | Reactor Pressure (Torr) | Thickness (nm) | EDOT P/P$_{sat}$ (ppm) | VOCl$_3$ P/P$_{sat}$ (ppm) | Deposition Rate (nm/min) |
|---|---|---|---|---|---|---|---|
| 80 | 12 | 9 | 1 | 14 | 138600 | 2390 | 7 |
| 80 | 12 | 9 | 1 | 78 | 138600 | 2390 | 7.1 |
| 80 | 12 | 9 | 1 | 370 | 138600 | 2390 | 7.4 |
| 140 | 12 | 9 | 1 | 29 | 16600 | 388 | 1.2 |
| 140 | 12 | 9 | 1 | 202 | 16600 | 388 | 1.1 |
| 140 | 12 | 9 | 1 | 470 | 16600 | 388 | 1.2 |

The percentage of preferential edge-on and face-on orientations obtained by considering the Lorentz-polarization (LP) factor. The in-plane electrical conductivity values obtained by the standard four-probe method.

TABLE S3

The XPS elemental analyses of pristine and oCVD PEDOT film after exposing to the electrolyte.

| Deposition Temperature (° C.) | Thickness (nm) | Crystalline Orientation | % Preferred Edge-on Orientation | % Preferred Face-on Orientation | In-plane Electrical Conductivity (S/cm) |
|---|---|---|---|---|---|
| 80 | 14 | Face-on | 0 | 100 | 1099 |
| 80 | 78 | Face-on + Edge-on | 8.1 | 91.9 | 484 |
| 80 | 370 | Face-on + Edge-on | 25.3 | 74.7 | 235 |
| 140 | 29 | Face-on | 0 | 100 | 2028 |
| 140 | 202 | Face-on | 0 | 100 | 825 |
| 140 | 470 | Face-on + Edge-on | 0.8 | 99.2 | 426 |

The atomic percentage (at. %) of PEDOT elements and iron after exposing to the iron chloride electrolyte containing 0.5M at 50% state-of-charge in 2M HCl.

| | S % | Cl % | C % | O % | Fe % |
|---|---|---|---|---|---|
| Pristine PEDOT | 14.22 | 5.26 | 62.7 | 17.82 | — |
| Exposed PEDOT to Electrolyte | 9.25 | 2.96 | 66.93 | 20.56 | 0.3 |

INCORPORATION BY REFERENCE

All publications and patents mentioned herein are hereby incorporated by reference in their entirety as if each individual publication or patent was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. An electrode, comprising a polymer film and a substrate, wherein: the polymer film comprises poly(3,4-ethylene dioxythiophene) (PEDOT); the polymer film comprises a plurality of crystallites in an edge-on orientation; the polymer film has a thickness of 5 nm to 600 nm; and the substrate is porous and carbonaceous.

2. The electrode of claim 1, wherein the average distance between each pore is from 1 to 1,000 nm.

3. The electrode of claim 1, wherein the polymer film has a thickness of 10 nm to 300 nm.

4. The electrode of claim 3, wherein the polymer film further comprises a dopant and the dopant is an acid.

5. The electrode of claim 4, wherein the dopant is HX; and X is halide or sulfate.

6. The electrode of claim 1, wherein the polymer film further comprises a dopant.

7. The electrode of claim 6, wherein the dopant is an acid.

8. The electrode of claim 7, wherein the dopant is HX; and X is halide or sulfate.

9. The electrode of claim 8, wherein the dopant is HCl.

10. The electrode of claim 1, wherein the polymer film comprises a plurality of pores.

11. The electrode of claim 1, wherein the polymer film comprises a plurality of nodules.

12. The electrode of claim 1, wherein the electrode comprises a plurality of fibrils or a plurality of fibers.

13. The electrode of claim 12, wherein the length of the crystallites in the a-axis direction (edge-on orientation) is 5 nm to 10 nm.

14. The electrode of claim 1, wherein the electrode does not comprise liquid-bridging or delamination.

15. The electrode of claim 1, wherein the electrode is ordered or uniform.

16. The electrode of claim 1, wherein the advancing water contact angle of the electrode is 50° to 70°.

17. The electrode of claim 1, wherein the receding water contact angle of the electrode is about 10° to about 30°.

18. An electrochemical cell, comprising an electrode of claim 1; and
an electrolyte.

19. A battery comprising an electrode of claim 1.

20. A method of making the electrode of claim 1, comprising:
providing a substrate;
contacting the substrate with ethylenedioxythiophene and an oxidant at first temperature; and
reducing the first temperature to a second temperature, thereby forming the electrode.

* * * * *